United States Patent
Balle et al.

(10) Patent No.: US 10,678,737 B2
(45) Date of Patent: Jun. 9, 2020

(54) TECHNOLOGIES FOR PROVIDING DYNAMIC COMMUNICATION PATH MODIFICATION FOR ACCELERATOR DEVICE KERNELS

(71) Applicant: Intel Corporation, Santa Clara, CA (US)

(72) Inventors: Susanne M. Balle, Hudson, NH (US); Slawomir Putyrski, Gdynia (PL); Joseph Grecco, Saddle Brook, NJ (US); Evan Custodio, Seekonk, MA (US); Francesc Guim Bernat, Barcelona (ES)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/235,982

(22) Filed: Dec. 28, 2018

(65) Prior Publication Data

US 2019/0138481 A1 May 9, 2019

(51) Int. Cl.
*G06F 13/40* (2006.01)
*G06F 9/4401* (2018.01)

(52) U.S. Cl.
CPC ........ *G06F 13/4027* (2013.01); *G06F 9/4401* (2013.01)

(58) Field of Classification Search
CPC ....... H04L 45/00; G06F 13/4027; G06F 13/00
See application file for complete search history.

(56) References Cited

U.S. PATENT DOCUMENTS

| 7,586,944 | B2 * | 9/2009 | Messick | H04L 41/0893 |
| | | | | 370/468 |
| 7,992,120 | B1 * | 8/2011 | Wang | G06F 17/5077 |
| | | | | 370/237 |
| 8,094,575 | B1 * | 1/2012 | Vadlakonda | H04L 45/123 |
| | | | | 370/252 |
| 2003/0115495 | A1 * | 6/2003 | Rawson, III | G06F 1/3228 |
| | | | | 713/324 |
| 2005/0114274 | A1 * | 5/2005 | Dube | G06Q 10/06 |
| | | | | 705/400 |
| 2013/0002396 | A1 * | 1/2013 | Sato | H04L 1/22 |
| | | | | 340/2.1 |
| 2013/0033978 | A1 * | 2/2013 | Eckert | H04L 45/16 |
| | | | | 370/216 |

(Continued)

*Primary Examiner* — Farley Abad
(74) *Attorney, Agent, or Firm* — Barnes & Thornburg LLP

(57) ABSTRACT

Technologies for providing dynamic communication path modification for accelerator device kernels include an accelerator device comprising circuitry to obtain initial availability data indicative of an availability of one or more accelerator device kernels in a system, including one or more physical communication paths to each accelerator device kernel. The circuitry is also to produce, as a function of the initial availability data, a connectivity matrix indicative of the physical communication paths and a logical communication path defined by one or more of the physical communication paths between a kernel of the present accelerator device and a target accelerator device kernel. Additionally, the circuitry is to obtain updated availability data indicative of a subsequent availability of each accelerator device kernel and update, as a function of the updated availability data, the connectivity matrix to modify the logical communication path.

19 Claims, 20 Drawing Sheets

(56) References Cited

U.S. PATENT DOCUMENTS

2016/0006837 A1* 1/2016 Reynolds ............. H04W 84/18
　　　　　　　　　　　　　　　　　　　　　　709/203
2016/0007273 A1* 1/2016 Farid .................... H04W 48/16
　　　　　　　　　　　　　　　　　　　　　　370/329

* cited by examiner

TECHNOLOGIES FOR PROVIDING DYNAMIC COMMUNICATION PATH MODIFICATION FOR ACCELERATOR DEVICE KERNELS

BACKGROUND

Accelerator devices, such as field programmable gate arrays (FPGAs), may be configured (e.g., by a bit stream defining a configuration of gates of the FPGA) to perform a set of functions, referred to herein as a kernel. The kernel may be configured, through time consuming effort on the part of a kernel developer, to establish a connection with another accelerator device kernel (e.g., another kernel in the same FPGA, a kernel in another FPGA, or a kernel of another type of accelerator device, such as a graphics processing unit (GPU), etc.) and share data with that other kernel to facilitate the completion of a workload (e.g., a set of operations that are to be performed). Typically, details of the communication protocol must be set out in the kernel by the kernel developer and, as the primary purpose of the kernel is to perform a set of operations (e.g., the workload) as efficiently as possible, the communication aspect of the kernel may be limited to communicating with a single type of accelerator device kernel if that accelerator device kernel happens to be available on a certain type of physical communication path (e.g., a PCIe bus). Furthermore, if conditions on a communication path between two kernels deteriorate (e.g., due to increased traffic from other devices using the communication path), the kernels may be unable to perform a corrective action (e.g., to maintain a target quality of service).

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
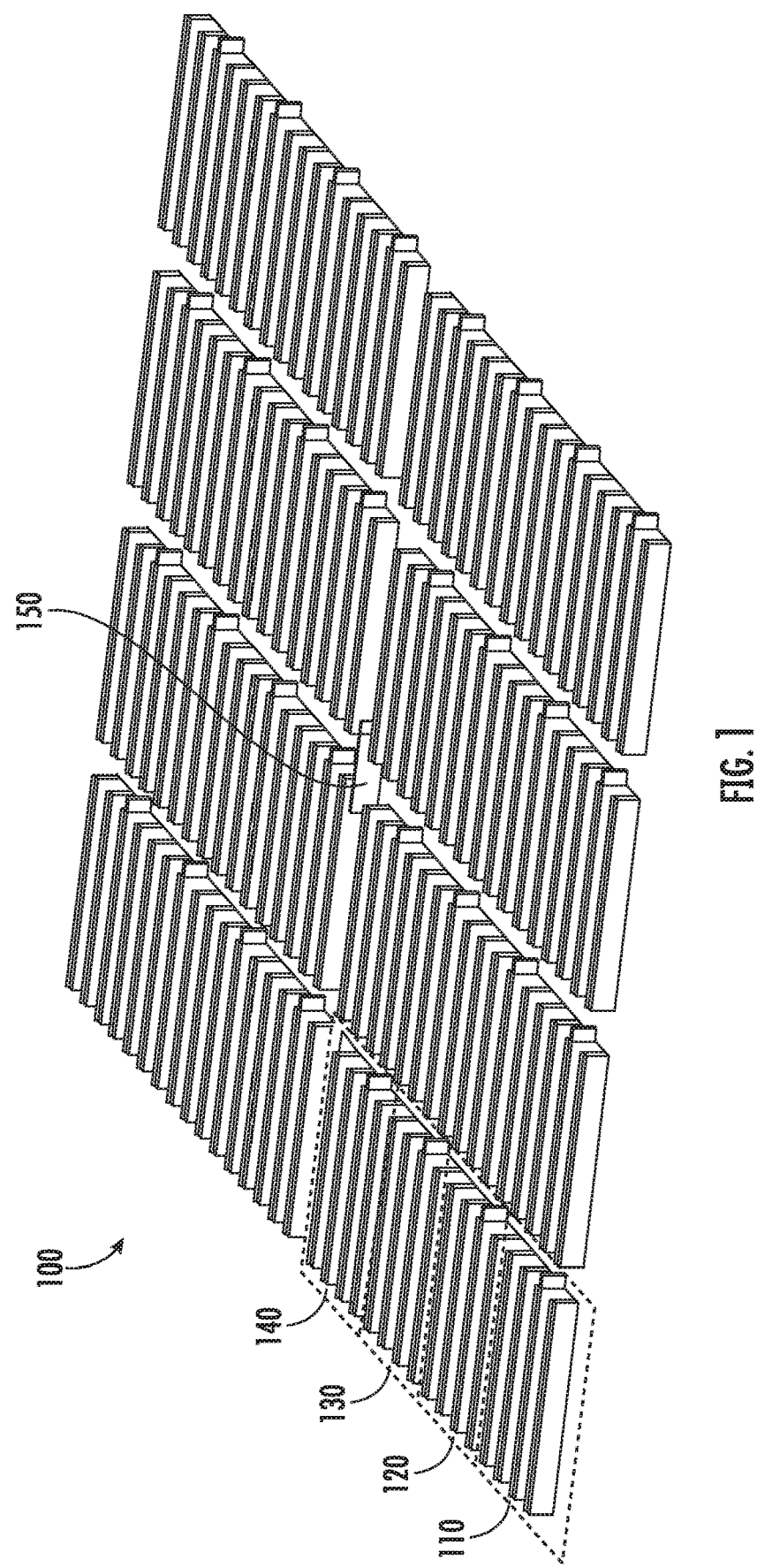
FIG. 1 is a simplified diagram of at least one embodiment of a data center for executing workloads with disaggregated resources.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures.

Additionally, the inclusion of a structural or method feature in a particular figure is not meant to imply that such feature is required in all embodiments and, in some embodiments, may not be included or may be combined with other features.

Referring now to FIG. 1, a data center 100 in which disaggregated resources may cooperatively execute one or more workloads (e.g., applications on behalf of customers) includes multiple pods 110, 120, 130, 140, each of which includes one or more rows of racks. Of course, although data center 100 is shown with multiple pods, in some embodiments, the data center 100 may be embodied as a single pod. As described in more detail herein, each rack houses multiple sleds, each of which may be primarily equipped with a particular type of resource (e.g., memory devices, data storage devices, accelerator devices, general purpose processors), i.e., resources that can be logically coupled to form a composed node, which can act as, for example, a server. In the illustrative embodiment, the sleds in each pod 110, 120, 130, 140 are connected to multiple pod switches (e.g., switches that route data communications to and from sleds within the pod). The pod switches, in turn, connect with spine switches 150 that switch communications among pods (e.g., the pods 110, 120, 130, 140) in the data center 100. In some embodiments, the sleds may be connected with a fabric using Intel Omni-Path technology. In other embodiments, the sleds may be connected with other fabrics, such as InfiniBand or Ethernet. As described in more detail herein, resources within sleds in the data center 100 may be allocated to a group (referred to herein as a "managed node") containing resources from one or more sleds to be collectively utilized in the execution of a workload. The workload can execute as if the resources belonging to the managed node were located on the same sled. The resources in a managed node may belong to sleds belonging to different racks, and even to different pods 110, 120, 130, 140. As such, some resources of a single sled may be allocated to one managed node while other resources of the same sled are allocated to a different managed node (e.g., one processor assigned to one managed node and another processor of the same sled assigned to a different managed node).

A data center comprising disaggregated resources, such as data center 100, can be used in a wide variety of contexts, such as enterprise, government, cloud service provider, and communications service provider (e.g., Telco's), as well in a wide variety of sizes, from cloud service provider mega-data centers that consume over 100,000 sq. ft. to single- or multi-rack installations for use in base stations.

The disaggregation of resources to sleds comprised predominantly of a single type of resource (e.g., compute sleds comprising primarily compute resources, memory sleds containing primarily memory resources), and the selective allocation and deallocation of the disaggregated resources to form a managed node assigned to execute a workload improves the operation and resource usage of the data center 100 relative to typical data centers comprised of hyperconverged servers containing compute, memory, storage and perhaps additional resources in a single chassis. For example, because sleds predominantly contain resources of a particular type, resources of a given type can be upgraded independently of other resources. Additionally, because different resources types (processors, storage, accelerators, etc.) typically have different refresh rates, greater resource utilization and reduced total cost of ownership may be achieved. For example, a data center operator can upgrade the processors throughout their facility by only swapping out the compute sleds. In such a case, accelerator and storage resources may not be contemporaneously upgraded and, rather, may be allowed to continue operating until those resources are scheduled for their own refresh. Resource utilization may also increase. For example, if managed nodes are composed based on requirements of the workloads that will be running on them, resources within a node are more likely to be fully utilized. Such utilization may allow for more managed nodes to run in a data center with a given set of resources, or for a data center expected to run a given set of workloads, to be built using fewer resources.

Figure 2:
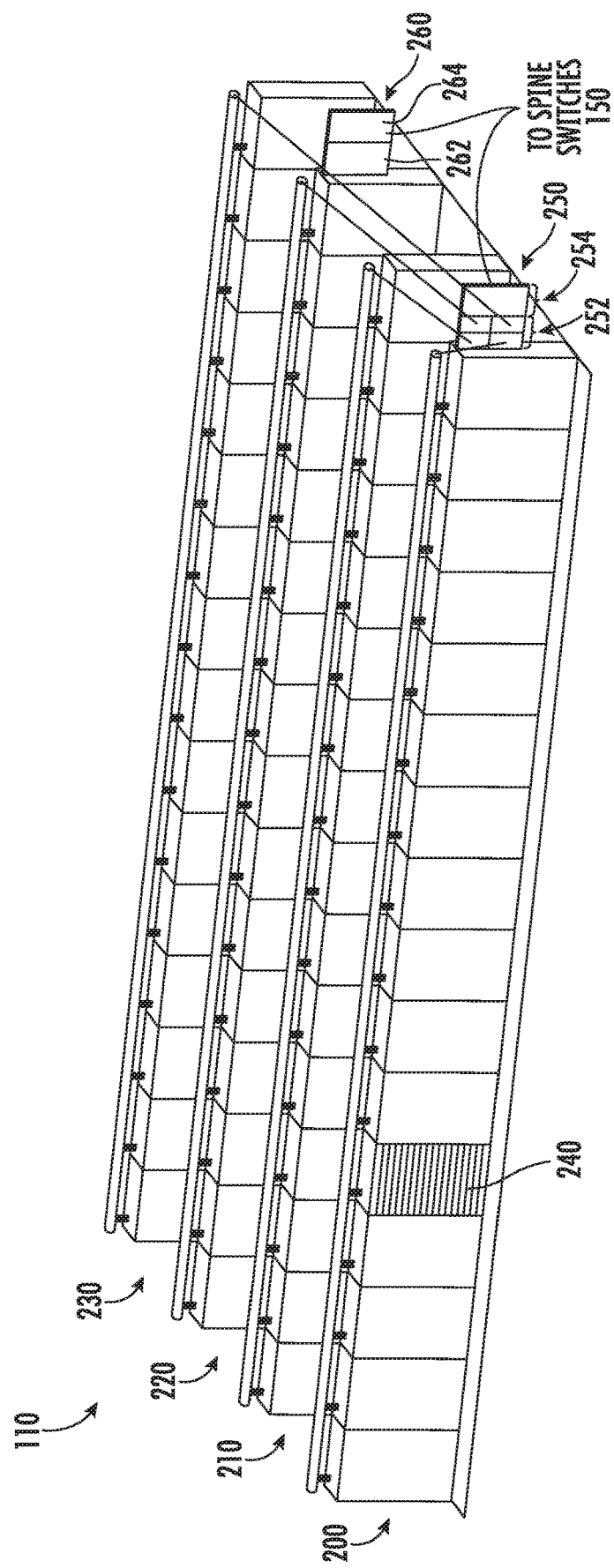
FIG. 2 is a simplified diagram of at least one embodiment of a pod that may be included in the data center of FIG. 1.

Referring now to FIG. 2, the pod 110, in the illustrative embodiment, includes a set of rows 200, 210, 220, 230 of racks 240. Each rack 240 may house multiple sleds (e.g., sixteen sleds) and provide power and data connections to the housed sleds, as described in more detail herein. In the illustrative embodiment, the racks in each row 200, 210, 220, 230 are connected to multiple pod switches 250, 260. The pod switch 250 includes a set of ports 252 to which the sleds of the racks of the pod 110 are connected and another set of ports 254 that connect the pod 110 to the spine switches 150 to provide connectivity to other pods in the data center 100. Similarly, the pod switch 260 includes a set of ports 262 to which the sleds of the racks of the pod 110 are connected and a set of ports 264 that connect the pod 110 to the spine switches 150. As such, the use of the pair of switches 250, 260 provides an amount of redundancy to the pod 110. For example, if either of the switches 250, 260 fails, the sleds in the pod 110 may still maintain data communication with the remainder of the data center 100 (e.g., sleds of other pods) through the other switch 250, 260. Furthermore, in the illustrative embodiment, the switches 150, 250, 260 may be embodied as dual-mode optical switches, capable of routing both Ethernet protocol communications carrying Internet Protocol (IP) packets and communications according to a second, high-performance link-layer protocol (e.g., Intel's Omni-Path Architecture's, InfiniBand, PCI Express) via optical signaling media of an optical fabric.

It should be appreciated that each of the other pods 120, 130, 140 (as well as any additional pods of the data center 100) may be similarly structured as, and have components similar to, the pod 110 shown in and described in regard to FIG. 2 (e.g., each pod may have rows of racks housing multiple sleds as described above). Additionally, while two pod switches 250, 260 are shown, it should be understood that in other embodiments, each pod 110, 120, 130, 140 may be connected to a different number of pod switches, providing even more failover capacity. Of course, in other embodiments, pods may be arranged differently than the rows-of-racks configuration shown in FIGS. 1-2. For example, a pod may be embodied as multiple sets of racks in which each set of racks is arranged radially, i.e., the racks are equidistant from a center switch.

Figure 3:
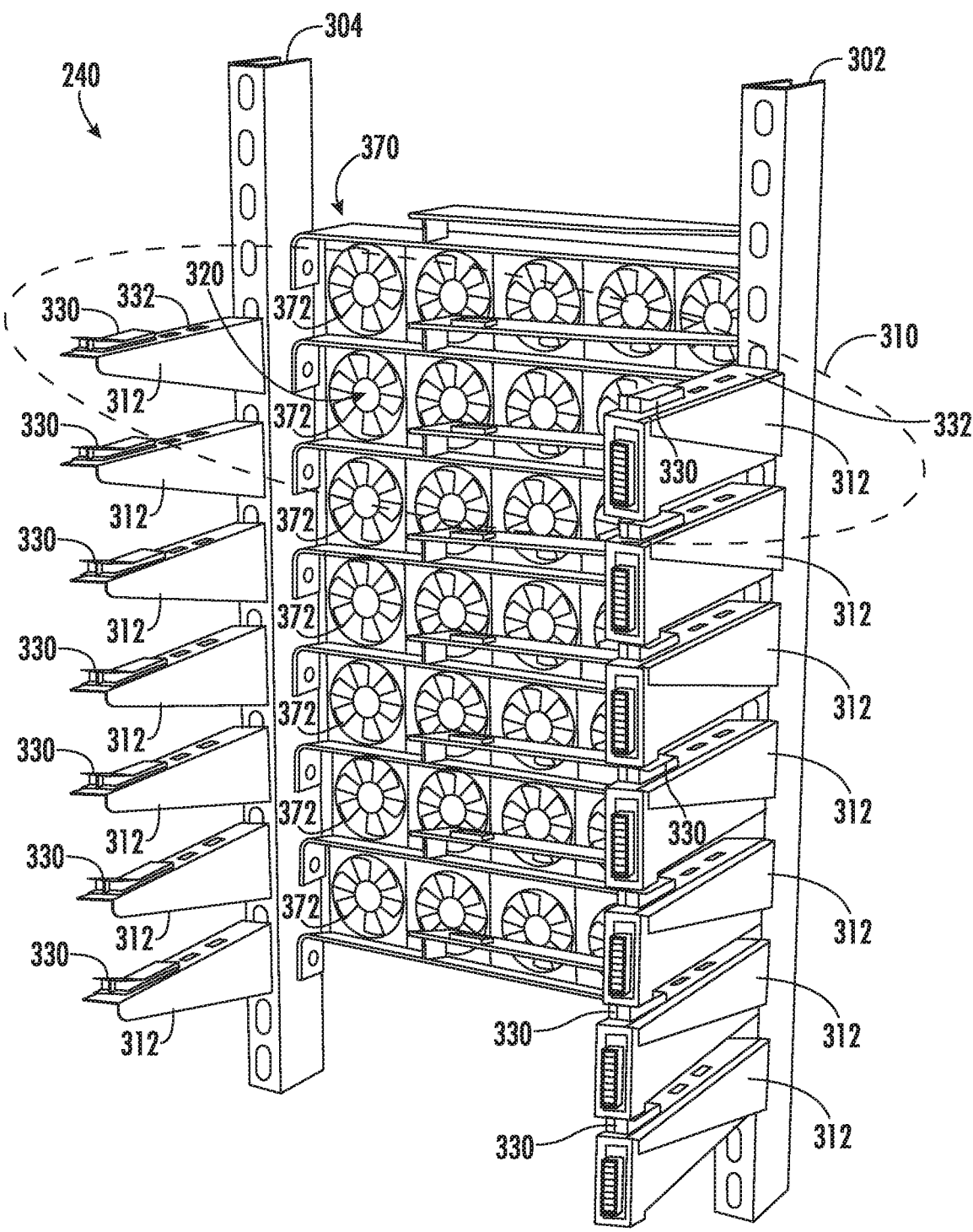
FIG. 3 is a perspective view of at least one embodiment of a rack that may be included in the pod of FIG. 2.
Figure 4:
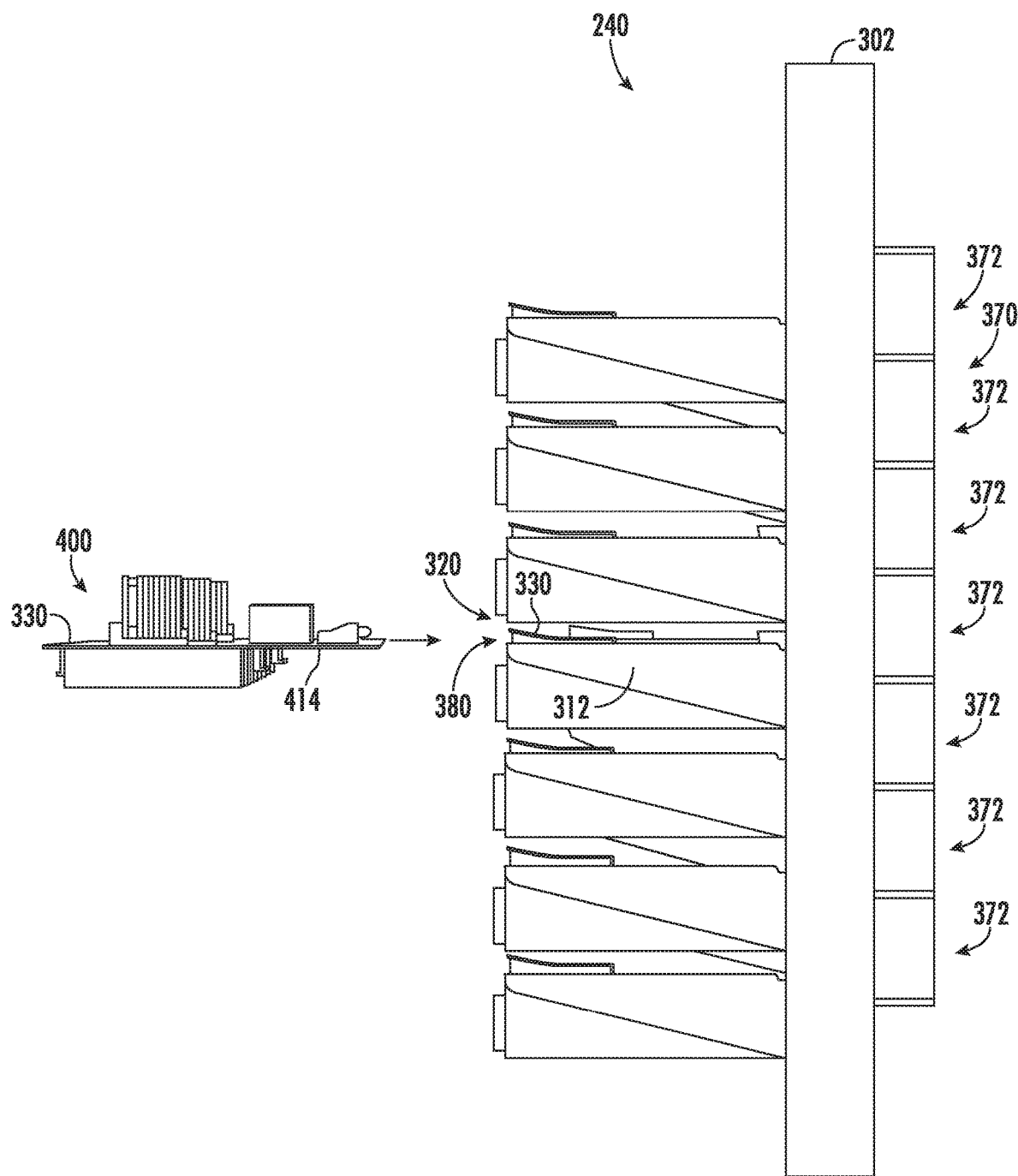
FIG. 4 is a side elevation view of the rack of FIG. 3.
Figure 5:
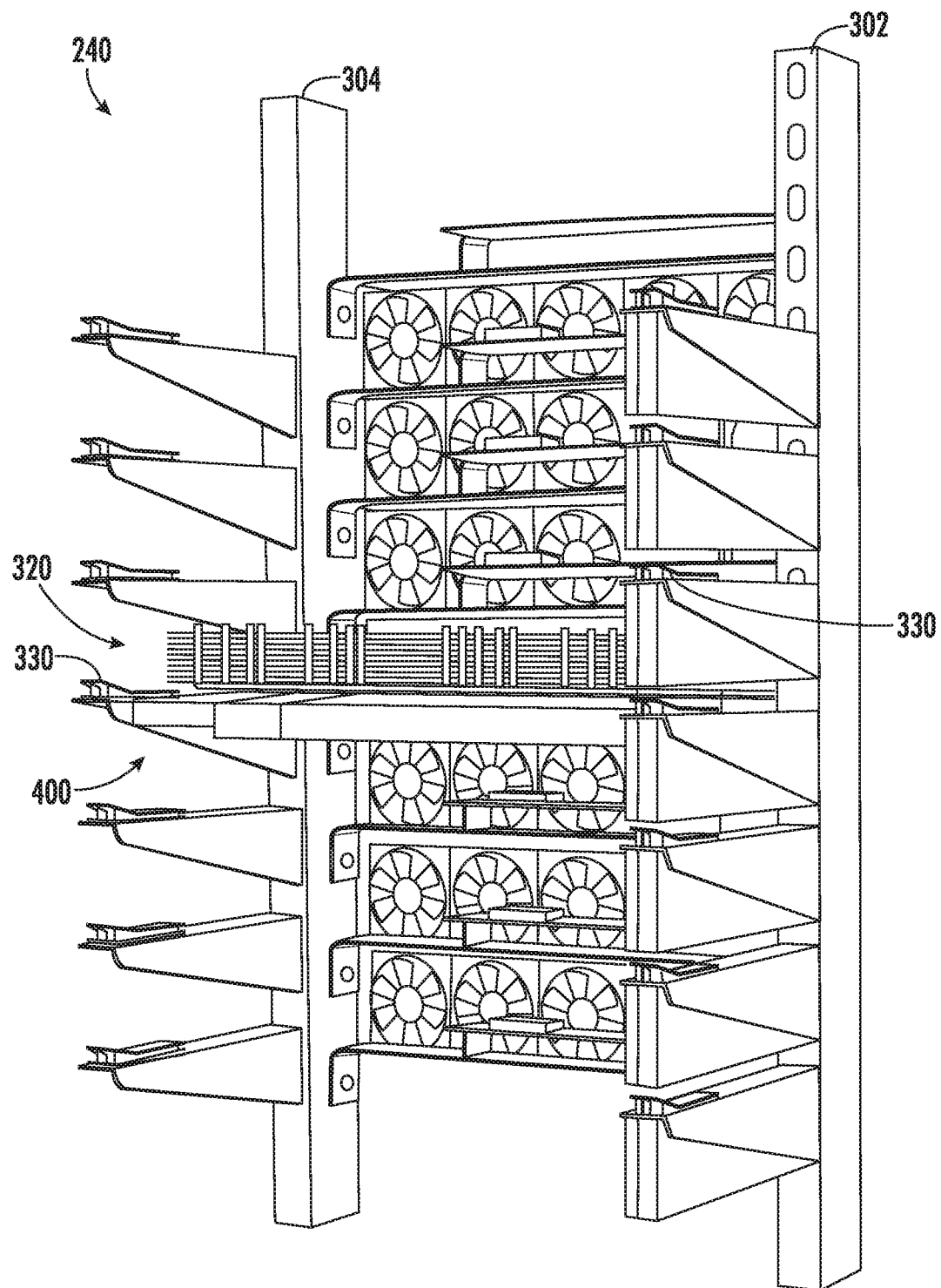
FIG. 5 is a perspective view of the rack of FIG. 3 having a sled mounted therein.

Referring now to FIGS. 3-5, each illustrative rack 240 of the data center 100 includes two elongated support posts 302, 304, which are arranged vertically. For example, the elongated support posts 302, 304 may extend upwardly from a floor of the data center 100 when deployed. The rack 240 also includes one or more horizontal pairs 310 of elongated support arms 312 (identified in FIG. 3 via a dashed ellipse) configured to support a sled of the data center 100 as discussed below. One elongated support arm 312 of the pair of elongated support arms 312 extends outwardly from the elongated support post 302 and the other elongated support arm 312 extends outwardly from the elongated support post 304.

In the illustrative embodiments, each sled of the data center 100 is embodied as a chassis-less sled. That is, each sled has a chassis-less circuit board substrate on which physical resources (e.g., processors, memory, accelerators, storage, etc.) are mounted as discussed in more detail below. As such, the rack 240 is configured to receive the chassis-less sleds. For example, each pair 310 of elongated support arms 312 defines a sled slot 320 of the rack 240, which is configured to receive a corresponding chassis-less sled. To do so, each illustrative elongated support arm 312 includes a circuit board guide 330 configured to receive the chassis-less circuit board substrate of the sled. Each circuit board guide 330 is secured to, or otherwise mounted to, a top side 332 of the corresponding elongated support arm 312. For example, in the illustrative embodiment, each circuit board guide 330 is mounted at a distal end of the corresponding elongated support arm 312 relative to the corresponding elongated support post 302, 304. For clarity of the Figures, not every circuit board guide 330 may be referenced in each Figure.

Each circuit board guide 330 includes an inner wall that defines a circuit board slot 380 configured to receive the chassis-less circuit board substrate of a sled 400 when the sled 400 is received in the corresponding sled slot 320 of the rack 240. To do so, as shown in FIG. 4, a user (or robot) aligns the chassis-less circuit board substrate of an illustrative chassis-less sled 400 to a sled slot 320. The user, or robot, may then slide the chassis-less circuit board substrate forward into the sled slot 320 such that each side edge 414 of the chassis-less circuit board substrate is received in a corresponding circuit board slot 380 of the circuit board guides 330 of the pair 310 of elongated support arms 312 that define the corresponding sled slot 320 as shown in FIG. 4. By having robotically accessible and robotically manipulable sleds comprising disaggregated resources, each type of resource can be upgraded independently of each other and at their own optimized refresh rate. Furthermore, the sleds are configured to blindly mate with power and data communication cables in each rack 240, enhancing their ability to be quickly removed, upgraded, reinstalled, and/or replaced. As such, in some embodiments, the data center 100 may operate (e.g., execute workloads, undergo maintenance and/or upgrades, etc.) without human involvement on the data center floor. In other embodiments, a human may facilitate one or more maintenance or upgrade operations in the data center 100.

It should be appreciated that each circuit board guide 330 is dual sided. That is, each circuit board guide 330 includes an inner wall that defines a circuit board slot 380 on each side of the circuit board guide 330. In this way, each circuit board guide 330 can support a chassis-less circuit board substrate on either side. As such, a single additional elongated support post may be added to the rack 240 to turn the rack 240 into a two-rack solution that can hold twice as many sled slots 320 as shown in FIG. 3. The illustrative rack 240 includes seven pairs 310 of elongated support arms 312 that define a corresponding seven sled slots 320, each configured to receive and support a corresponding sled 400 as discussed above. Of course, in other embodiments, the rack 240 may include additional or fewer pairs 310 of elongated support arms 312 (i.e., additional or fewer sled slots 320). It should be appreciated that because the sled 400 is chassis-less, the sled 400 may have an overall height that is different than typical servers. As such, in some embodiments, the height of each sled slot 320 may be shorter than the height of a typical server (e.g., shorter than a single rank unit, "1 U"). That is, the vertical distance between each pair 310 of elongated support arms 312 may be less than a standard rack unit "1 U." Additionally, due to the relative decrease in height of the sled slots 320, the overall height of the rack 240 in some embodiments may be shorter than the height of traditional rack enclosures. For example, in some embodiments, each of the elongated support posts 302, 304 may have a length of six feet or less. Again, in other embodiments, the rack 240 may have different dimensions. For example, in some embodiments, the vertical distance between each pair 310 of elongated support arms 312 may be greater than a standard rack until "1 U". In such embodiments, the increased vertical distance between the sleds allows for larger heat sinks to be attached to the physical resources and for larger fans to be used (e.g., in the fan array 370 described below) for cooling each sled, which in turn can allow the physical resources to operate at increased power levels. Further, it should be appreciated that the rack 240 does not include any walls, enclosures, or the like. Rather, the rack 240 is an enclosure-less rack that is opened to the local environment. Of course, in some cases, an end plate may be attached to one of the elongated support posts 302, 304 in those situations in which the rack 240 forms an end-of-row rack in the data center 100.

In some embodiments, various interconnects may be routed upwardly or downwardly through the elongated support posts 302, 304. To facilitate such routing, each elongated support post 302, 304 includes an inner wall that defines an inner chamber in which interconnects may be located. The interconnects routed through the elongated support posts 302, 304 may be embodied as any type of interconnects including, but not limited to, data or communication interconnects to provide communication connections to each sled slot 320, power interconnects to provide power to each sled slot 320, and/or other types of interconnects.

The rack 240, in the illustrative embodiment, includes a support platform on which a corresponding optical data connector (not shown) is mounted. Each optical data connector is associated with a corresponding sled slot 320 and is configured to mate with an optical data connector of a corresponding sled 400 when the sled 400 is received in the corresponding sled slot 320. In some embodiments, optical connections between components (e.g., sleds, racks, and switches) in the data center 100 are made with a blind mate optical connection. For example, a door on each cable may prevent dust from contaminating the fiber inside the cable. In the process of connecting to a blind mate optical connector mechanism, the door is pushed open when the end of the cable approaches or enters the connector mechanism. Subsequently, the optical fiber inside the cable may enter a gel within the connector mechanism and the optical fiber of one cable comes into contact with the optical fiber of another cable within the gel inside the connector mechanism.

The illustrative rack 240 also includes a fan array 370 coupled to the cross-support arms of the rack 240. The fan array 370 includes one or more rows of cooling fans 372, which are aligned in a horizontal line between the elongated support posts 302, 304. In the illustrative embodiment, the fan array 370 includes a row of cooling fans 372 for each sled slot 320 of the rack 240. As discussed above, each sled 400 does not include any on-board cooling system in the illustrative embodiment and, as such, the fan array 370 provides cooling for each sled 400 received in the rack 240. Each rack 240, in the illustrative embodiment, also includes a power supply associated with each sled slot 320. Each power supply is secured to one of the elongated support arms 312 of the pair 310 of elongated support arms 312 that define the corresponding sled slot 320. For example, the rack 240 may include a power supply coupled or secured to each elongated support arm 312 extending from the elongated support post 302. Each power supply includes a power connector configured to mate with a power connector of the sled 400 when the sled 400 is received in the corresponding sled slot 320. In the illustrative embodiment, the sled 400 does not include any on-board power supply and, as such, the power supplies provided in the rack 240 supply power to corresponding sleds 400 when mounted to the rack 240. Each power supply is configured to satisfy the power requirements for its associated sled, which can vary from sled to sled. Additionally, the power supplies provided in the rack 240 can operate independent of each other. That is, within a single rack, a first power supply providing power to a compute sled can provide power levels that are different than power levels supplied by a second power supply providing power to an accelerator sled. The power supplies may be controllable at the sled level or rack level, and may be controlled locally by components on the associated sled or remotely, such as by another sled or an orchestrator.

Figure 6:
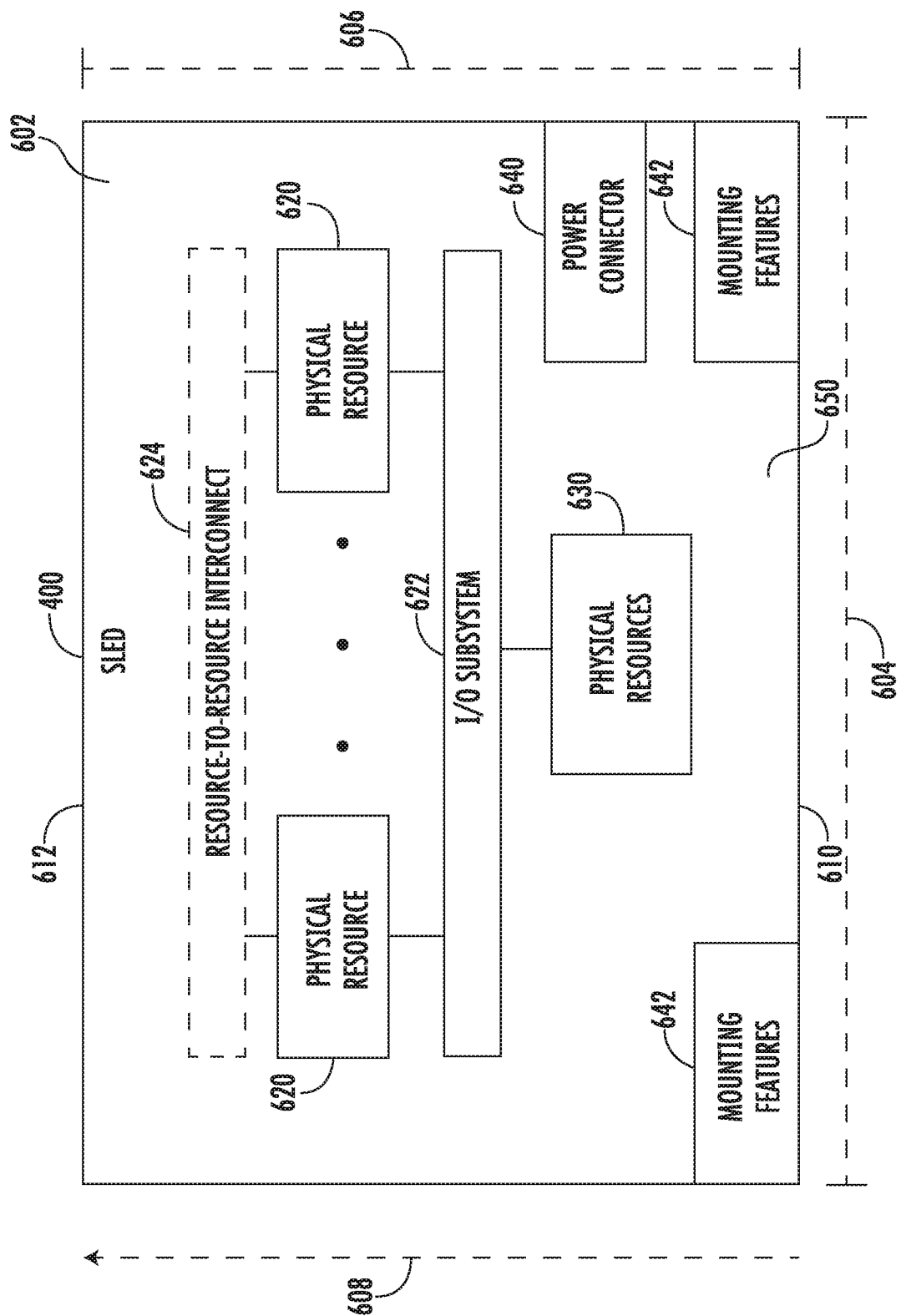
FIG. 6 is a is a simplified block diagram of at least one embodiment of a top side of the sled of FIG. 5.

Referring now to FIG. 6, the sled 400, in the illustrative embodiment, is configured to be mounted in a corresponding rack 240 of the data center 100 as discussed above. In some embodiments, each sled 400 may be optimized or otherwise configured for performing particular tasks, such as compute tasks, acceleration tasks, data storage tasks, etc. For example, the sled 400 may be embodied as a compute sled 800 as discussed below in regard to FIGS. 8-9, an accelerator sled 1000 as discussed below in regard to FIGS. 10-11, a storage sled 1200 as discussed below in regard to FIGS. 12-13, or as a sled optimized or otherwise configured to perform other specialized tasks, such as a memory sled 1400, discussed below in regard to FIG. 14.

As discussed above, the illustrative sled 400 includes a chassis-less circuit board substrate 602, which supports various physical resources (e.g., electrical components) mounted thereon. It should be appreciated that the circuit board substrate 602 is "chassis-less" in that the sled 400 does not include a housing or enclosure. Rather, the chassis-less circuit board substrate 602 is open to the local environment. The chassis-less circuit board substrate 602 may be formed from any material capable of supporting the various electrical components mounted thereon. For example, in an illustrative embodiment, the chassis-less circuit board substrate 602 is formed from an FR-4 glass-reinforced epoxy laminate material. Of course, other materials may be used to form the chassis-less circuit board substrate 602 in other embodiments.

As discussed in more detail below, the chassis-less circuit board substrate 602 includes multiple features that improve the thermal cooling characteristics of the various electrical components mounted on the chassis-less circuit board substrate 602. As discussed, the chassis-less circuit board substrate 602 does not include a housing or enclosure, which may improve the airflow over the electrical components of the sled 400 by reducing those structures that may inhibit air flow. For example, because the chassis-less circuit board substrate 602 is not positioned in an individual housing or enclosure, there is no vertically-arranged backplane (e.g., a backplate of the chassis) attached to the chassis-less circuit board substrate 602, which could inhibit air flow across the electrical components. Additionally, the chassis-less circuit board substrate 602 has a geometric shape configured to reduce the length of the airflow path across the electrical components mounted to the chassis-less circuit board substrate 602. For example, the illustrative chassis-less circuit board substrate 602 has a width 604 that is greater than a depth 606 of the chassis-less circuit board substrate 602. In one particular embodiment, for example, the chassis-less circuit board substrate 602 has a width of about 21 inches and a depth of about 9 inches, compared to a typical server that has a width of about 17 inches and a depth of about 39 inches. As such, an airflow path 608 that extends from a front edge 610 of the chassis-less circuit board substrate 602 toward a rear edge 612 has a shorter distance relative to typical servers, which may improve the thermal cooling characteristics of the sled 400. Furthermore, although not illustrated in FIG. 6, the various physical resources mounted to the chassis-less circuit board substrate 602 are mounted in corresponding locations such that no two substantively heat-producing electrical components shadow each other as discussed in more detail below. That is, no two electrical components, which produce appreciable heat during operation (i.e., greater than a nominal heat sufficient enough to adversely impact the cooling of another electrical component), are mounted to the chassis-less circuit board substrate 602 linearly in-line with each other along the direction of the airflow path 608 (i.e., along a direction extending from the front edge 610 toward the rear edge 612 of the chassis-less circuit board substrate 602).

As discussed above, the illustrative sled 400 includes one or more physical resources 620 mounted to a top side 650 of the chassis-less circuit board substrate 602. Although two physical resources 620 are shown in FIG. 6, it should be appreciated that the sled 400 may include one, two, or more physical resources 620 in other embodiments. The physical resources 620 may be embodied as any type of processor, controller, or other compute circuit capable of performing various tasks such as compute functions and/or controlling the functions of the sled 400 depending on, for example, the type or intended functionality of the sled 400. For example, as discussed in more detail below, the physical resources 620 may be embodied as high-performance processors in embodiments in which the sled 400 is embodied as a compute sled, as accelerator co-processors or circuits in embodiments in which the sled 400 is embodied as an accelerator sled, storage controllers in embodiments in which the sled 400 is embodied as a storage sled, or a set of memory devices in embodiments in which the sled 400 is embodied as a memory sled.

The sled 400 also includes one or more additional physical resources 630 mounted to the top side 650 of the chassis-less circuit board substrate 602. In the illustrative embodiment, the additional physical resources include a network interface controller (NIC) as discussed in more detail below. Of course, depending on the type and functionality of the sled 400, the physical resources 630 may include additional or other electrical components, circuits, and/or devices in other embodiments.

The physical resources 620 are communicatively coupled to the physical resources 630 via an input/output (I/O) subsystem 622. The I/O subsystem 622 may be embodied as circuitry and/or components to facilitate input/output operations with the physical resources 620, the physical resources 630, and/or other components of the sled 400. For example, the I/O subsystem 622 may be embodied as, or otherwise include, memory controller hubs, input/output control hubs, integrated sensor hubs, firmware devices, communication links (e.g., point-to-point links, bus links, wires, cables, waveguides, light guides, printed circuit board traces, etc.), and/or other components and subsystems to facilitate the input/output operations. In the illustrative embodiment, the I/O subsystem 622 is embodied as, or otherwise includes, a double data rate 4 (DDR4) data bus or a DDR5 data bus.

In some embodiments, the sled 400 may also include a resource-to-resource interconnect 624. The resource-to-resource interconnect 624 may be embodied as any type of communication interconnect capable of facilitating resource-to-resource communications. In the illustrative embodiment, the resource-to-resource interconnect 624 is embodied as a high-speed point-to-point interconnect (e.g., faster than the I/O subsystem 622). For example, the resource-to-resource interconnect 624 may be embodied as a QuickPath Interconnect (QPI), an UltraPath Interconnect (UPI), or other high-speed point-to-point interconnect dedicated to resource-to-resource communications.

The sled 400 also includes a power connector 640 configured to mate with a corresponding power connector of the rack 240 when the sled 400 is mounted in the corresponding rack 240. The sled 400 receives power from a power supply of the rack 240 via the power connector 640 to supply power to the various electrical components of the sled 400. That is, the sled 400 does not include any local power supply (i.e., an on-board power supply) to provide power to the electrical components of the sled 400. The exclusion of a local or on-board power supply facilitates the reduction in the overall footprint of the chassis-less circuit board substrate 602, which may increase the thermal cooling characteristics of the various electrical components mounted on the chassis-less circuit board substrate 602 as discussed above. In some embodiments, voltage regulators are placed on a bottom side 750 (see FIG. 7) of the chassis-less circuit board substrate 602 directly opposite of the processors 820 (see FIG. 8), and power is routed from the voltage regulators to the processors 820 by vias extending through the circuit board substrate 602. Such a configuration provides an increased thermal budget, additional current and/or voltage, and better voltage control relative to typical printed circuit boards in which processor power is delivered from a voltage regulator, in part, by printed circuit traces.

In some embodiments, the sled 400 may also include mounting features 642 configured to mate with a mounting arm, or other structure, of a robot to facilitate the placement of the sled 600 in a rack 240 by the robot. The mounting features 642 may be embodied as any type of physical structures that allow the robot to grasp the sled 400 without damaging the chassis-less circuit board substrate 602 or the electrical components mounted thereto. For example, in some embodiments, the mounting features 642 may be embodied as non-conductive pads attached to the chassis-less circuit board substrate 602. In other embodiments, the mounting features may be embodied as brackets, braces, or other similar structures attached to the chassis-less circuit board substrate 602. The particular number, shape, size, and/or make-up of the mounting feature 642 may depend on the design of the robot configured to manage the sled 400.

Figure 7:
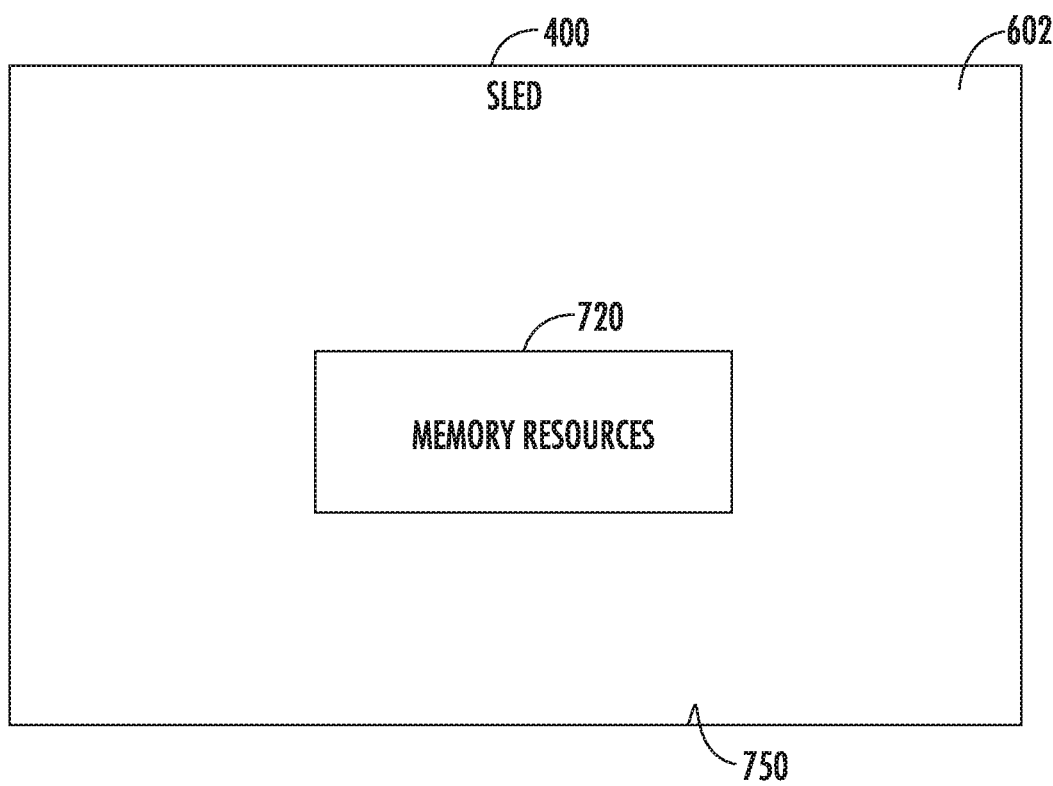
FIG. 7 is a simplified block diagram of at least one embodiment of a bottom side of the sled of FIG. 6.

Referring now to FIG. 7, in addition to the physical resources 630 mounted on the top side 650 of the chassis-less circuit board substrate 602, the sled 400 also includes one or more memory devices 720 mounted to a bottom side 750 of the chassis-less circuit board substrate 602. That is, the chassis-less circuit board substrate 602 is embodied as a double-sided circuit board. The physical resources 620 are communicatively coupled to the memory devices 720 via the I/O subsystem 622. For example, the physical resources 620 and the memory devices 720 may be communicatively coupled by one or more vias extending through the chassis-less circuit board substrate 602. Each physical resource 620 may be communicatively coupled to a different set of one or more memory devices 720 in some embodiments. Alternatively, in other embodiments, each physical resource 620 may be communicatively coupled to each memory device 720.

The memory devices 720 may be embodied as any type of memory device capable of storing data for the physical resources 620 during operation of the sled 400, such as any type of volatile (e.g., dynamic random access memory (DRAM), etc.) or non-volatile memory. Volatile memory may be a storage medium that requires power to maintain the state of data stored by the medium. Non-limiting examples of volatile memory may include various types of random access memory (RAM), such as dynamic random access memory (DRAM) or static random access memory (SRAM). One particular type of DRAM that may be used in a memory module is synchronous dynamic random access memory (SDRAM). In particular embodiments, DRAM of a memory component may comply with a standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces.

In one embodiment, the memory device is a block addressable memory device, such as those based on NAND or NOR technologies. A memory device may also include next-generation nonvolatile devices, such as Intel 3D XPoint™ memory or other byte addressable write-in-place nonvolatile memory devices. In one embodiment, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory. The memory device may refer to the die itself and/or to a packaged memory product. In some embodiments, the memory device may comprise a transistor-less stackable cross point architecture in which memory cells sit at the intersection of word lines and bit lines and are individually addressable and in which bit storage is based on a change in bulk resistance.

Figure 8:
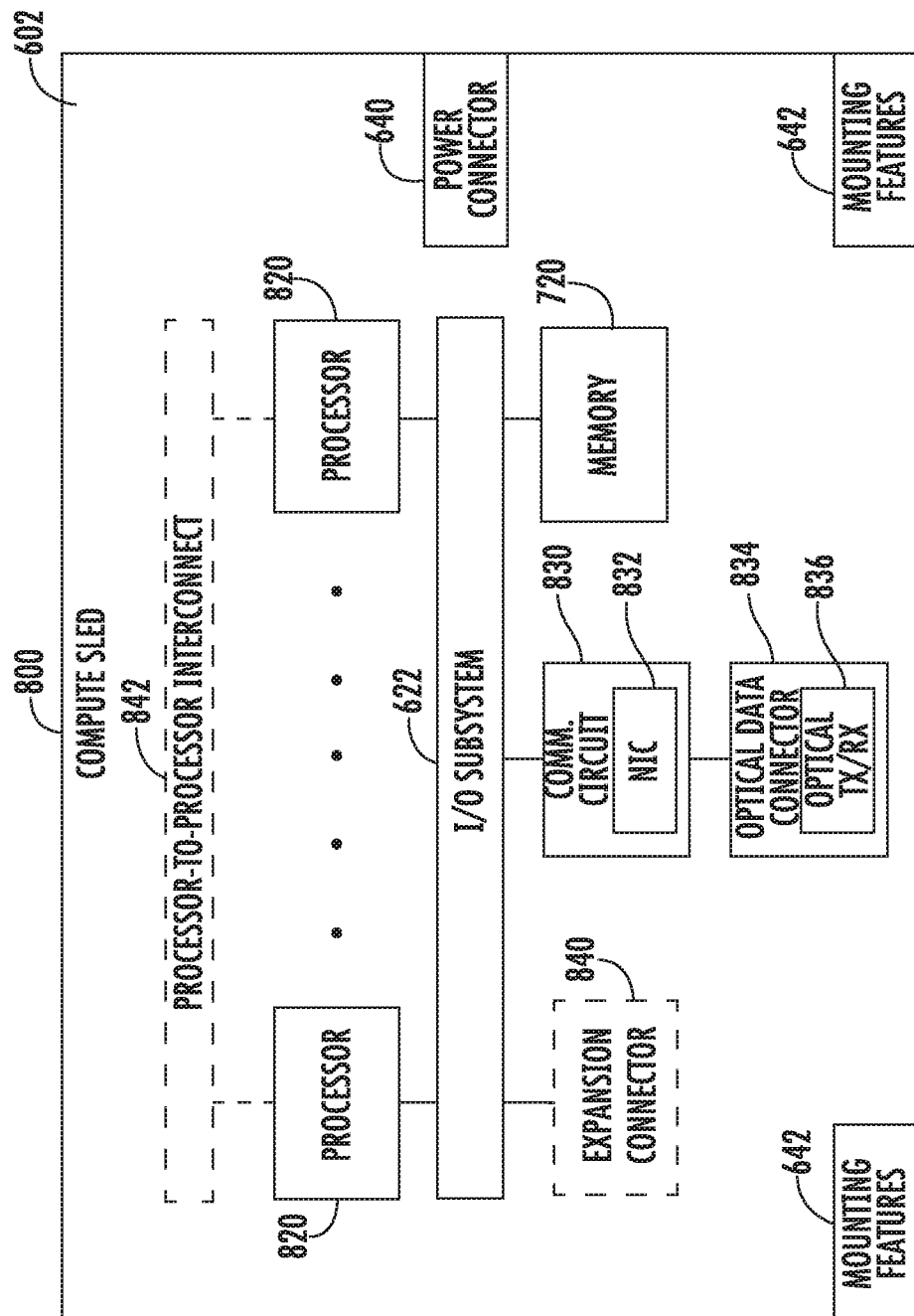
FIG. 8 is a simplified block diagram of at least one embodiment of a compute sled usable in the data center of FIG. 1.

Referring now to FIG. 8, in some embodiments, the sled 400 may be embodied as a compute sled 800. The compute sled 800 is optimized, or otherwise configured, to perform compute tasks. Of course, as discussed above, the compute sled 800 may rely on other sleds, such as acceleration sleds and/or storage sleds, to perform such compute tasks. The compute sled 800 includes various physical resources (e.g., electrical components) similar to the physical resources of the sled 400, which have been identified in FIG. 8 using the same reference numbers. The description of such components provided above in regard to FIGS. 6 and 7 applies to the corresponding components of the compute sled 800 and is not repeated herein for clarity of the description of the compute sled 800.

In the illustrative compute sled 800, the physical resources 620 are embodied as processors 820. Although only two processors 820 are shown in FIG. 8, it should be appreciated that the compute sled 800 may include additional processors 820 in other embodiments. Illustratively, the processors 820 are embodied as high-performance processors 820 and may be configured to operate at a relatively high power rating. Although the processors 820 generate additional heat operating at power ratings greater than typical processors (which operate at around 155-230 W), the enhanced thermal cooling characteristics of the chassis-less circuit board substrate 602 discussed above facilitate the higher power operation. For example, in the illustrative embodiment, the processors 820 are configured to operate at a power rating of at least 250 W. In some embodiments, the processors 820 may be configured to operate at a power rating of at least 350 W.

In some embodiments, the compute sled 800 may also include a processor-to-processor interconnect 842. Similar to the resource-to-resource interconnect 624 of the sled 400 discussed above, the processor-to-processor interconnect 842 may be embodied as any type of communication interconnect capable of facilitating processor-to-processor interconnect 842 communications. In the illustrative embodiment, the processor-to-processor interconnect 842 is embodied as a high-speed point-to-point interconnect (e.g., faster than the I/O subsystem 622). For example, the processor-to-processor interconnect 842 may be embodied as a QuickPath Interconnect (QPI), an UltraPath Interconnect (UPI), or other high-speed point-to-point interconnect dedicated to processor-to-processor communications.

The compute sled 800 also includes a communication circuit 830. The illustrative communication circuit 830 includes a network interface controller (NIC) 832, which may also be referred to as a host fabric interface (HFI). The NIC 832 may be embodied as, or otherwise include, any type of integrated circuit, discrete circuits, controller chips, chipsets, add-in-boards, daughtercards, network interface cards, or other devices that may be used by the compute sled 800 to connect with another compute device (e.g., with other sleds 400). In some embodiments, the NIC 832 may be embodied as part of a system-on-a-chip (SoC) that includes one or more processors, or included on a multichip package that also contains one or more processors. In some embodiments, the NIC 832 may include a local processor (not shown) and/or a local memory (not shown) that are both local to the NIC 832. In such embodiments, the local processor of the NIC 832 may be capable of performing one or more of the functions of the processors 820. Additionally or alternatively, in such embodiments, the local memory of the NIC 832 may be integrated into one or more components of the compute sled at the board level, socket level, chip level, and/or other levels.

The communication circuit 830 is communicatively coupled to an optical data connector 834. The optical data connector 834 is configured to mate with a corresponding optical data connector of the rack 240 when the compute sled 800 is mounted in the rack 240. Illustratively, the optical data connector 834 includes a plurality of optical fibers which lead from a mating surface of the optical data connector 834 to an optical transceiver 836. The optical transceiver 836 is configured to convert incoming optical signals from the rack-side optical data connector to electrical signals and to convert electrical signals to outgoing optical signals to the rack-side optical data connector. Although shown as forming part of the optical data connector 834 in the illustrative embodiment, the optical transceiver 836 may form a portion of the communication circuit 830 in other embodiments.

In some embodiments, the compute sled 800 may also include an expansion connector 840. In such embodiments, the expansion connector 840 is configured to mate with a corresponding connector of an expansion chassis-less circuit board substrate to provide additional physical resources to the compute sled 800. The additional physical resources may be used, for example, by the processors 820 during operation of the compute sled 800. The expansion chassis-less circuit board substrate may be substantially similar to the chassis-less circuit board substrate 602 discussed above and may include various electrical components mounted thereto. The particular electrical components mounted to the expansion chassis-less circuit board substrate may depend on the intended functionality of the expansion chassis-less circuit board substrate. For example, the expansion chassis-less circuit board substrate may provide additional compute resources, memory resources, and/or storage resources. As such, the additional physical resources of the expansion chassis-less circuit board substrate may include, but is not limited to, processors, memory devices, storage devices, and/or accelerator circuits including, for example, field programmable gate arrays (FPGA), application-specific integrated circuits (ASICs), security co-processors, graphics processing units (GPUs), machine learning circuits, or other specialized processors, controllers, devices, and/or circuits.

Figure 9:
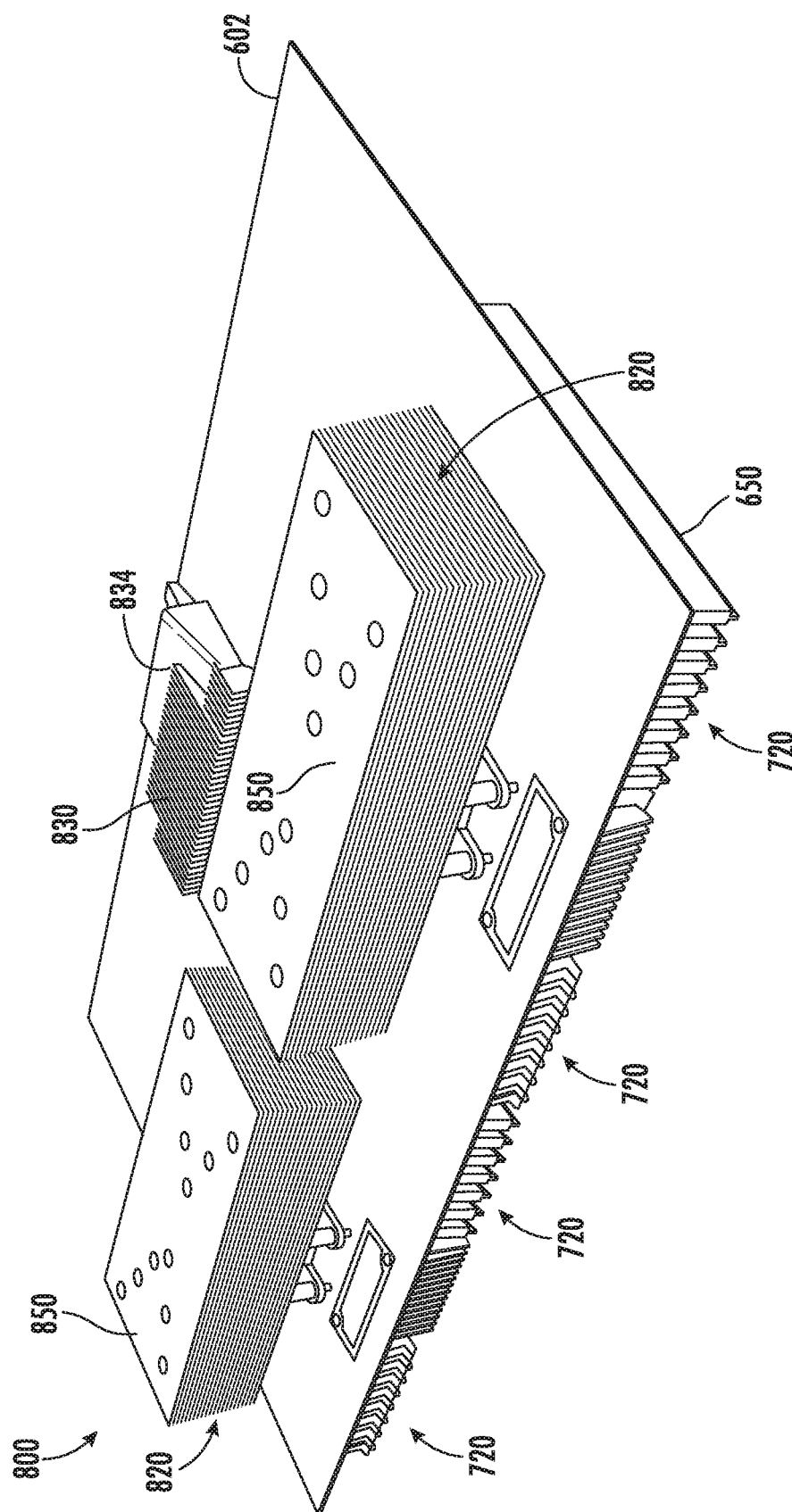
FIG. 9 is a top perspective view of at least one embodiment of the compute sled of FIG. 8.

Referring now to FIG. 9, an illustrative embodiment of the compute sled 800 is shown. As shown, the processors 820, communication circuit 830, and optical data connector 834 are mounted to the top side 650 of the chassis-less circuit board substrate 602. Any suitable attachment or mounting technology may be used to mount the physical resources of the compute sled 800 to the chassis-less circuit board substrate 602. For example, the various physical resources may be mounted in corresponding sockets (e.g., a processor socket), holders, or brackets. In some cases, some of the electrical components may be directly mounted to the chassis-less circuit board substrate 602 via soldering or similar techniques.

As discussed above, the individual processors 820 and communication circuit 830 are mounted to the top side 650 of the chassis-less circuit board substrate 602 such that no two heat-producing, electrical components shadow each other. In the illustrative embodiment, the processors 820 and communication circuit 830 are mounted in corresponding locations on the top side 650 of the chassis-less circuit board substrate 602 such that no two of those physical resources are linearly in-line with others along the direction of the airflow path 608. It should be appreciated that, although the optical data connector 834 is in-line with the communication circuit 830, the optical data connector 834 produces no or nominal heat during operation.

The memory devices 720 of the compute sled 800 are mounted to the bottom side 750 of the of the chassis-less circuit board substrate 602 as discussed above in regard to the sled 400. Although mounted to the bottom side 750, the memory devices 720 are communicatively coupled to the processors 820 located on the top side 650 via the I/O subsystem 622. Because the chassis-less circuit board substrate 602 is embodied as a double-sided circuit board, the memory devices 720 and the processors 820 may be communicatively coupled by one or more vias, connectors, or other mechanisms extending through the chassis-less circuit board substrate 602. Of course, each processor 820 may be communicatively coupled to a different set of one or more memory devices 720 in some embodiments. Alternatively, in other embodiments, each processor 820 may be communicatively coupled to each memory device 720. In some embodiments, the memory devices 720 may be mounted to one or more memory mezzanines on the bottom side of the chassis-less circuit board substrate 602 and may interconnect with a corresponding processor 820 through a ball-grid array.

Each of the processors 820 includes a heatsink 850 secured thereto. Due to the mounting of the memory devices 720 to the bottom side 750 of the chassis-less circuit board substrate 602 (as well as the vertical spacing of the sleds 400 in the corresponding rack 240), the top side 650 of the chassis-less circuit board substrate 602 includes additional "free" area or space that facilitates the use of heatsinks 850 having a larger size relative to traditional heatsinks used in typical servers. Additionally, due to the improved thermal cooling characteristics of the chassis-less circuit board substrate 602, none of the processor heatsinks 850 include cooling fans attached thereto. That is, each of the heatsinks 850 is embodied as a fan-less heatsink. In some embodiments, the heat sinks 850 mounted atop the processors 820 may overlap with the heat sink attached to the communication circuit 830 in the direction of the airflow path 608 due to their increased size, as illustratively suggested by FIG. 9.

Figure 10:
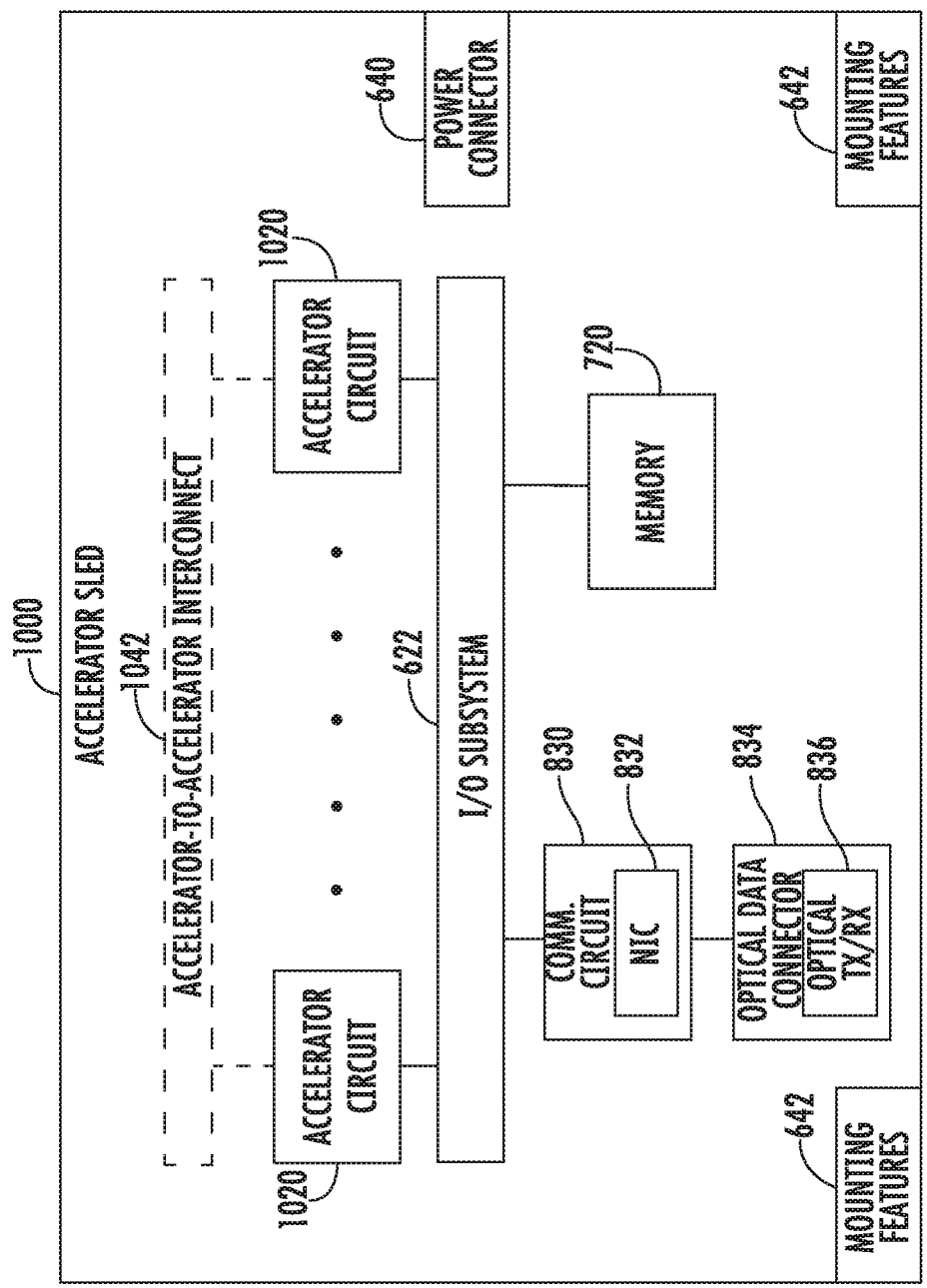
FIG. 10 is a simplified block diagram of at least one embodiment of an accelerator sled usable in the data center of FIG. 1.

Referring now to FIG. 10, in some embodiments, the sled 400 may be embodied as an accelerator sled 1000. The accelerator sled 1000 is configured, to perform specialized compute tasks, such as machine learning, encryption, hashing, or other computational-intensive task. In some embodiments, for example, a compute sled 800 may offload tasks to the accelerator sled 1000 during operation. The accelerator sled 1000 includes various components similar to components of the sled 400 and/or compute sled 800, which have been identified in FIG. 10 using the same reference numbers. The description of such components provided above in regard to FIGS. 6, 7, and 8 apply to the corresponding components of the accelerator sled 1000 and is not repeated herein for clarity of the description of the accelerator sled 1000.

Figure 11:
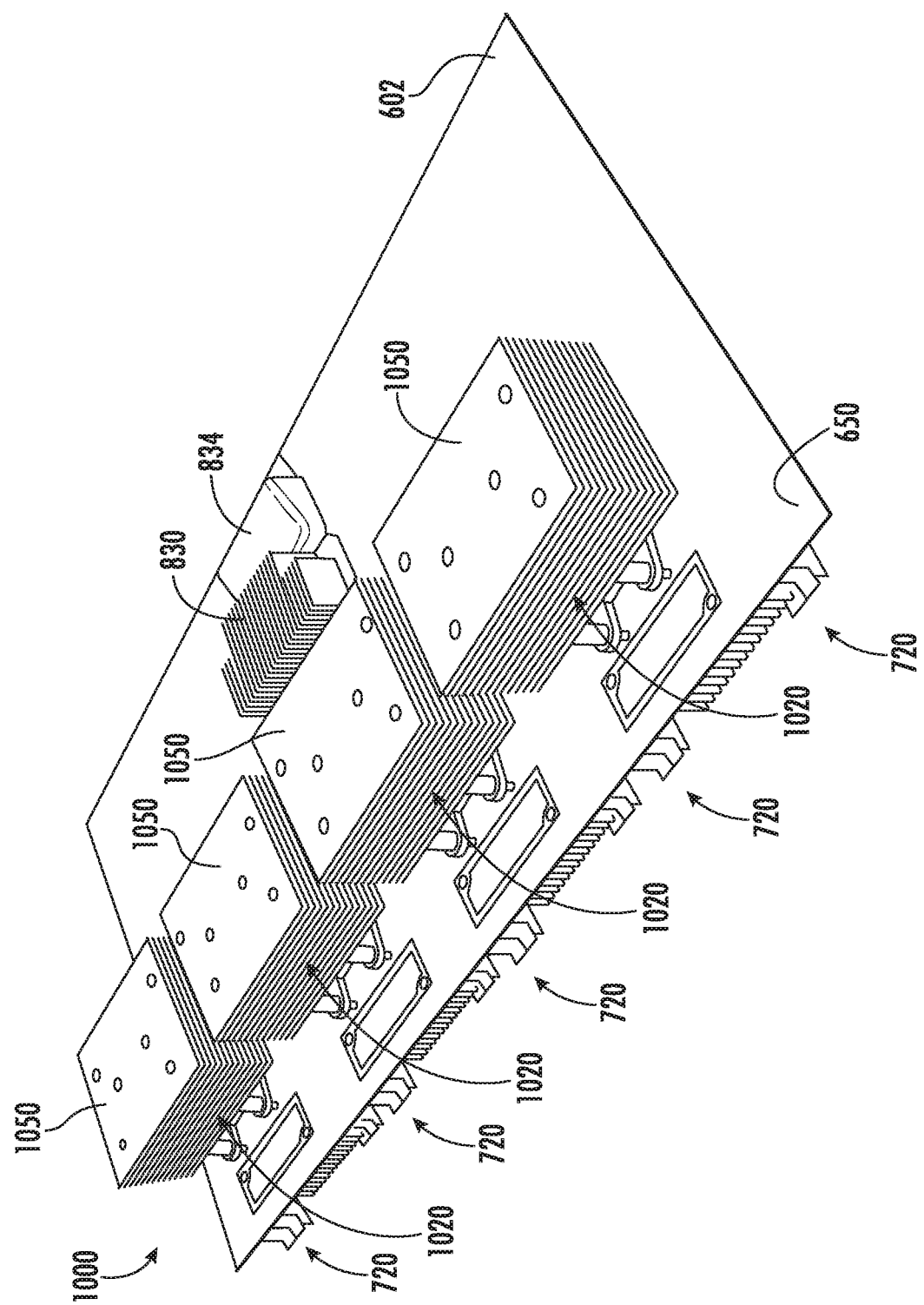
FIG. 11 is a top perspective view of at least one embodiment of the accelerator sled of FIG. 10.

In the illustrative accelerator sled 1000, the physical resources 620 are embodied as accelerator circuits 1020. Although only two accelerator circuits 1020 are shown in FIG. 10, it should be appreciated that the accelerator sled 1000 may include additional accelerator circuits 1020 in other embodiments. For example, as shown in FIG. 11, the accelerator sled 1000 may include four accelerator circuits 1020 in some embodiments. The accelerator circuits 1020 may be embodied as any type of processor, co-processor, compute circuit, or other device capable of performing compute or processing operations. For example, the accelerator circuits 1020 may be embodied as, for example, field programmable gate arrays (FPGA), application-specific integrated circuits (ASICs), security co-processors, graphics processing units (GPUs), neuromorphic processor units, quantum computers, machine learning circuits, or other specialized processors, controllers, devices, and/or circuits.

In some embodiments, the accelerator sled 1000 may also include an accelerator-to-accelerator interconnect 1042. Similar to the resource-to-resource interconnect 624 of the sled 600 discussed above, the accelerator-to-accelerator interconnect 1042 may be embodied as any type of communication interconnect capable of facilitating accelerator-to-accelerator communications. In the illustrative embodiment, the accelerator-to-accelerator interconnect 1042 is embodied as a high-speed point-to-point interconnect (e.g., faster than the I/O subsystem 622). For example, the accelerator-to-accelerator interconnect 1042 may be embodied as a QuickPath Interconnect (QPI), an UltraPath Interconnect (UPI), or other high-speed point-to-point interconnect dedicated to processor-to-processor communications. In some embodiments, the accelerator circuits 1020 may be daisy-chained with a primary accelerator circuit 1020 connected to the NIC 832 and memory 720 through the I/O subsystem 622 and a secondary accelerator circuit 1020 connected to the NIC 832 and memory 720 through a primary accelerator circuit 1020.

Referring now to FIG. 11, an illustrative embodiment of the accelerator sled 1000 is shown. As discussed above, the accelerator circuits 1020, communication circuit 830, and optical data connector 834 are mounted to the top side 650 of the chassis-less circuit board substrate 602. Again, the individual accelerator circuits 1020 and communication circuit 830 are mounted to the top side 650 of the chassis-less circuit board substrate 602 such that no two heat-producing, electrical components shadow each other as discussed above. The memory devices 720 of the accelerator sled 1000 are mounted to the bottom side 750 of the of the chassis-less circuit board substrate 602 as discussed above in regard to the sled 600. Although mounted to the bottom side 750, the memory devices 720 are communicatively coupled to the accelerator circuits 1020 located on the top side 650 via the I/O subsystem 622 (e.g., through vias). Further, each of the accelerator circuits 1020 may include a heatsink 1070 that is larger than a traditional heatsink used in a server. As discussed above with reference to the heatsinks 870, the heatsinks 1070 may be larger than traditional heatsinks because of the "free" area provided by the memory resources 720 being located on the bottom side 750 of the chassis-less circuit board substrate 602 rather than on the top side 650.

Figure 12:
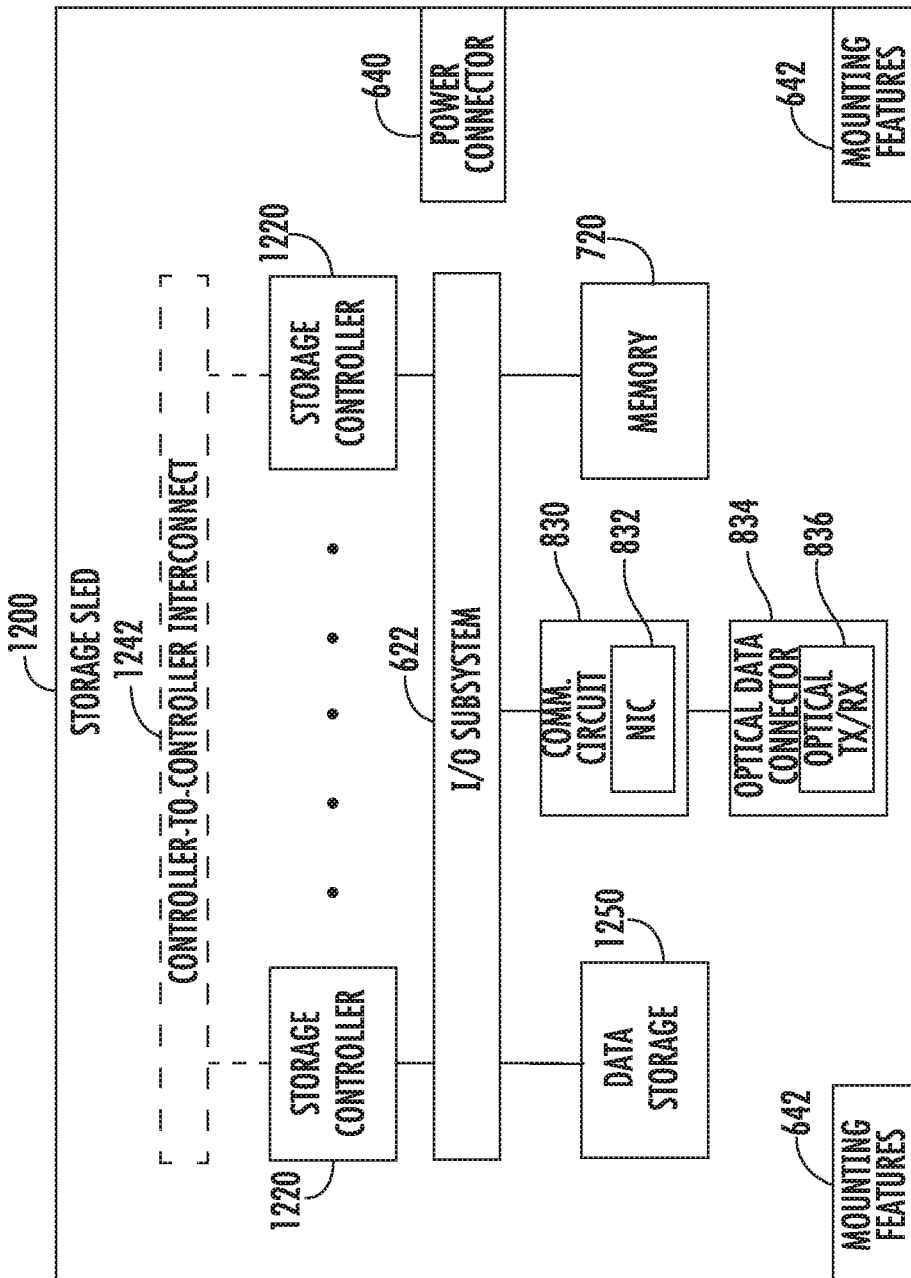
FIG. 12 is a simplified block diagram of at least one embodiment of a storage sled usable in the data center of FIG. 1.

Referring now to FIG. 12, in some embodiments, the sled 400 may be embodied as a storage sled 1200. The storage sled 1200 is configured, to store data in a data storage 1250 local to the storage sled 1200. For example, during operation, a compute sled 800 or an accelerator sled 1000 may store and retrieve data from the data storage 1250 of the storage sled 1200. The storage sled 1200 includes various components similar to components of the sled 400 and/or the compute sled 800, which have been identified in FIG. 12 using the same reference numbers. The description of such components provided above in regard to FIGS. 6, 7, and 8 apply to the corresponding components of the storage sled 1200 and is not repeated herein for clarity of the description of the storage sled 1200.

In the illustrative storage sled 1200, the physical resources 620 are embodied as storage controllers 1220. Although only two storage controllers 1220 are shown in FIG. 12, it should be appreciated that the storage sled 1200 may include additional storage controllers 1220 in other embodiments. The storage controllers 1220 may be embodied as any type of processor, controller, or control circuit capable of controlling the storage and retrieval of data into the data storage 1250 based on requests received via the communication circuit 830. In the illustrative embodiment, the storage controllers 1220 are embodied as relatively low-power processors or controllers. For example, in some embodiments, the storage controllers 1220 may be configured to operate at a power rating of about 75 watts.

In some embodiments, the storage sled 1200 may also include a controller-to-controller interconnect 1242. Similar to the resource-to-resource interconnect 624 of the sled 400 discussed above, the controller-to-controller interconnect 1242 may be embodied as any type of communication interconnect capable of facilitating controller-to-controller communications. In the illustrative embodiment, the controller-to-controller interconnect 1242 is embodied as a high-speed point-to-point interconnect (e.g., faster than the I/O subsystem 622). For example, the controller-to-controller interconnect 1242 may be embodied as a QuickPath Interconnect (QPI), an UltraPath Interconnect (UPI), or other high-speed point-to-point interconnect dedicated to processor-to-processor communications.

Figure 13:
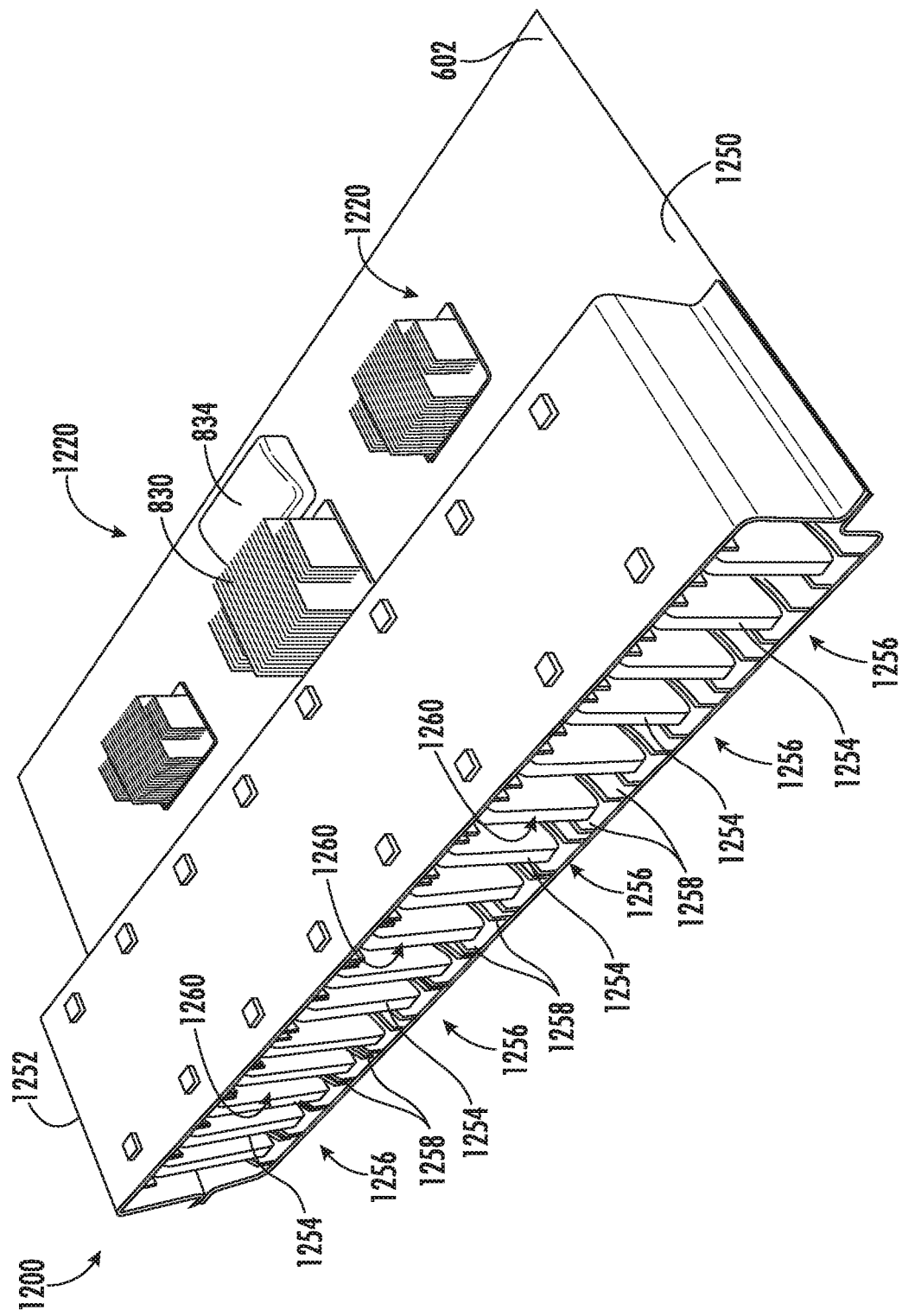
FIG. 13 is a top perspective view of at least one embodiment of the storage sled of FIG. 12.

Referring now to FIG. 13, an illustrative embodiment of the storage sled 1200 is shown. In the illustrative embodiment, the data storage 1250 is embodied as, or otherwise includes, a storage cage 1252 configured to house one or more solid state drives (SSDs) 1254. To do so, the storage cage 1252 includes a number of mounting slots 1256, each of which is configured to receive a corresponding solid state drive 1254. Each of the mounting slots 1256 includes a number of drive guides 1258 that cooperate to define an access opening 1260 of the corresponding mounting slot 1256. The storage cage 1252 is secured to the chassis-less circuit board substrate 602 such that the access openings face away from (i.e., toward the front of) the chassis-less circuit board substrate 602. As such, solid state drives 1254 are accessible while the storage sled 1200 is mounted in a corresponding rack 204. For example, a solid state drive 1254 may be swapped out of a rack 240 (e.g., via a robot) while the storage sled 1200 remains mounted in the corresponding rack 240.

The storage cage 1252 illustratively includes sixteen mounting slots 1256 and is capable of mounting and storing sixteen solid state drives 1254. Of course, the storage cage 1252 may be configured to store additional or fewer solid state drives 1254 in other embodiments. Additionally, in the illustrative embodiment, the solid state drivers are mounted vertically in the storage cage 1252, but may be mounted in the storage cage 1252 in a different orientation in other embodiments. Each solid state drive 1254 may be embodied as any type of data storage device capable of storing long term data. To do so, the solid state drives 1254 may include volatile and non-volatile memory devices discussed above.

As shown in FIG. 13, the storage controllers 1220, the communication circuit 830, and the optical data connector 834 are illustratively mounted to the top side 650 of the chassis-less circuit board substrate 602. Again, as discussed above, any suitable attachment or mounting technology may be used to mount the electrical components of the storage sled 1200 to the chassis-less circuit board substrate 602 including, for example, sockets (e.g., a processor socket), holders, brackets, soldered connections, and/or other mounting or securing techniques.

As discussed above, the individual storage controllers 1220 and the communication circuit 830 are mounted to the top side 650 of the chassis-less circuit board substrate 602 such that no two heat-producing, electrical components shadow each other. For example, the storage controllers 1220 and the communication circuit 830 are mounted in corresponding locations on the top side 650 of the chassis-less circuit board substrate 602 such that no two of those electrical components are linearly in-line with each other along the direction of the airflow path 608.

The memory devices 720 of the storage sled 1200 are mounted to the bottom side 750 of the of the chassis-less circuit board substrate 602 as discussed above in regard to the sled 400. Although mounted to the bottom side 750, the memory devices 720 are communicatively coupled to the storage controllers 1220 located on the top side 650 via the I/O subsystem 622. Again, because the chassis-less circuit board substrate 602 is embodied as a double-sided circuit board, the memory devices 720 and the storage controllers 1220 may be communicatively coupled by one or more vias, connectors, or other mechanisms extending through the chassis-less circuit board substrate 602. Each of the storage controllers 1220 includes a heatsink 1270 secured thereto. As discussed above, due to the improved thermal cooling characteristics of the chassis-less circuit board substrate 602 of the storage sled 1200, none of the heatsinks 1270 include cooling fans attached thereto. That is, each of the heatsinks 1270 is embodied as a fan-less heatsink.

Figure 14:
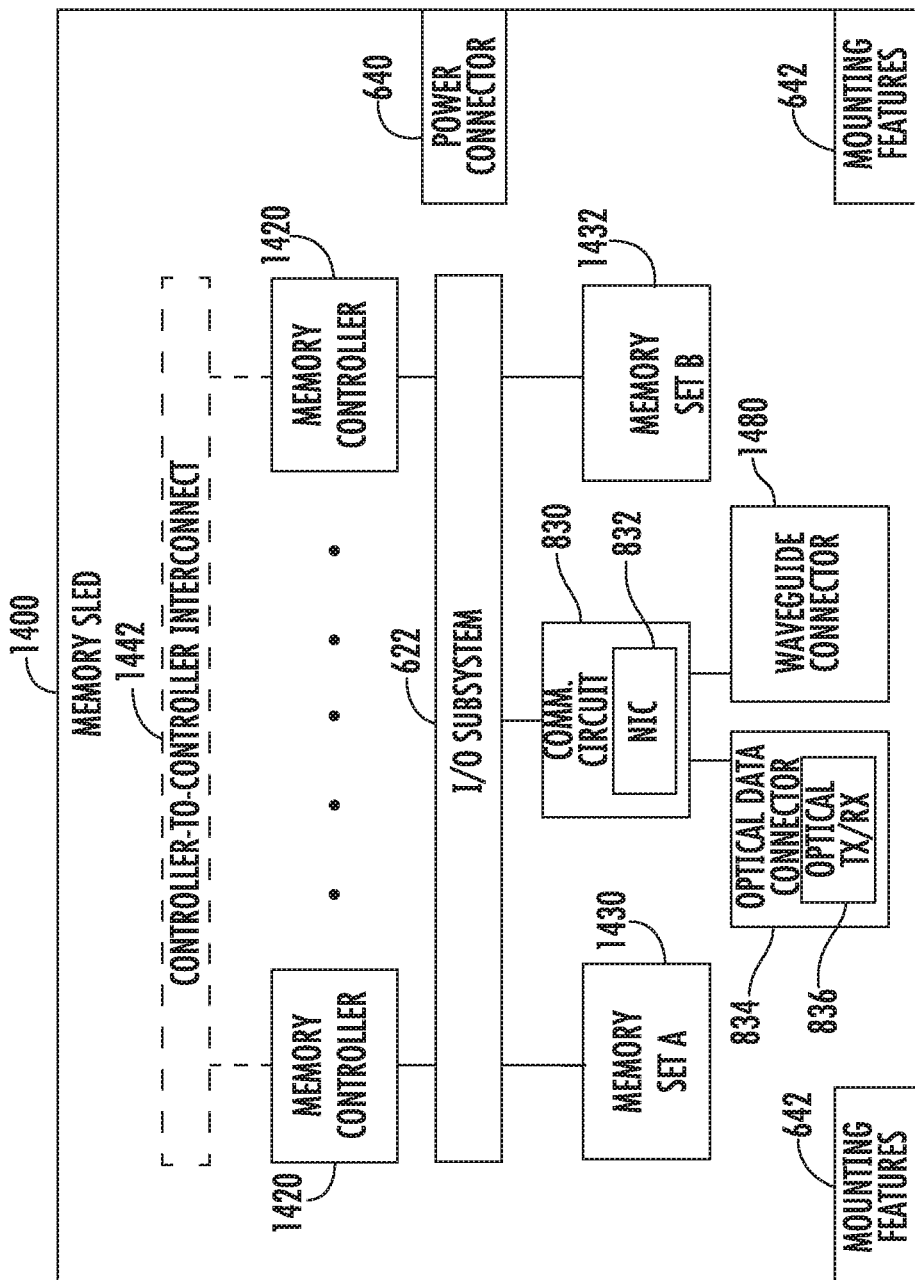
FIG. 14 is a simplified block diagram of at least one embodiment of a memory sled usable in the data center of FIG. 1.

Referring now to FIG. 14, in some embodiments, the sled 400 may be embodied as a memory sled 1400. The storage sled 1400 is optimized, or otherwise configured, to provide other sleds 400 (e.g., compute sleds 800, accelerator sleds 1000, etc.) with access to a pool of memory (e.g., in two or more sets 1430, 1432 of memory devices 720) local to the memory sled 1200. For example, during operation, a compute sled 800 or an accelerator sled 1000 may remotely write to and/or read from one or more of the memory sets 1430, 1432 of the memory sled 1200 using a logical address space that maps to physical addresses in the memory sets 1430, 1432. The memory sled 1400 includes various components similar to components of the sled 400 and/or the compute sled 800, which have been identified in FIG. 14 using the same reference numbers. The description of such components provided above in regard to FIGS. 6, 7, and 8 apply to the corresponding components of the memory sled 1400 and is not repeated herein for clarity of the description of the memory sled 1400.

In the illustrative memory sled 1400, the physical resources 620 are embodied as memory controllers 1420. Although only two memory controllers 1420 are shown in FIG. 14, it should be appreciated that the memory sled 1400 may include additional memory controllers 1420 in other embodiments. The memory controllers 1420 may be embodied as any type of processor, controller, or control circuit capable of controlling the writing and reading of data into the memory sets 1430, 1432 based on requests received via the communication circuit 830. In the illustrative embodiment, each memory controller 1420 is connected to a corresponding memory set 1430, 1432 to write to and read from memory devices 720 within the corresponding memory set 1430, 1432 and enforce any permissions (e.g., read, write, etc.) associated with sled 400 that has sent a request to the memory sled 1400 to perform a memory access operation (e.g., read or write).

In some embodiments, the memory sled 1400 may also include a controller-to-controller interconnect 1442. Similar to the resource-to-resource interconnect 624 of the sled 400 discussed above, the controller-to-controller interconnect 1442 may be embodied as any type of communication interconnect capable of facilitating controller-to-controller communications. In the illustrative embodiment, the controller-to-controller interconnect 1442 is embodied as a high-speed point-to-point interconnect (e.g., faster than the I/O subsystem 622). For example, the controller-to-controller interconnect 1442 may be embodied as a QuickPath Interconnect (QPI), an UltraPath Interconnect (UPI), or other high-speed point-to-point interconnect dedicated to processor-to-processor communications. As such, in some embodiments, a memory controller 1420 may access, through the controller-to-controller interconnect 1442, memory that is within the memory set 1432 associated with another memory controller 1420. In some embodiments, a scalable memory controller is made of multiple smaller memory controllers, referred to herein as "chiplets", on a memory sled (e.g., the memory sled 1400). The chiplets may be interconnected (e.g., using EMIB (Embedded Multi-Die Interconnect Bridge)). The combined chiplet memory controller may scale up to a relatively large number of memory controllers and I/O ports, (e.g., up to 16 memory channels). In some embodiments, the memory controllers 1420 may implement a memory interleave (e.g., one memory address is mapped to the memory set 1430, the next memory address is mapped to the memory set 1432, and the third address is mapped to the memory set 1430, etc.). The interleaving may be managed within the memory controllers 1420, or from CPU sockets (e.g., of the compute sled 800) across network links to the memory sets 1430, 1432, and may improve the latency associated with performing memory access operations as compared to accessing contiguous memory addresses from the same memory device.

Further, in some embodiments, the memory sled 1400 may be connected to one or more other sleds 400 (e.g., in the same rack 240 or an adjacent rack 240) through a waveguide, using the waveguide connector 1480. In the illustrative embodiment, the waveguides are 64 millimeter waveguides that provide 16 Rx (i.e., receive) lanes and 16 Tx (i.e., transmit) lanes. Each lane, in the illustrative embodiment, is either 16 GHz or 32 GHz. In other embodiments, the frequencies may be different. Using a waveguide may provide high throughput access to the memory pool (e.g., the memory sets 1430, 1432) to another sled (e.g., a sled 400 in the same rack 240 or an adjacent rack 240 as the memory sled 1400) without adding to the load on the optical data connector 834.

Figure 15:
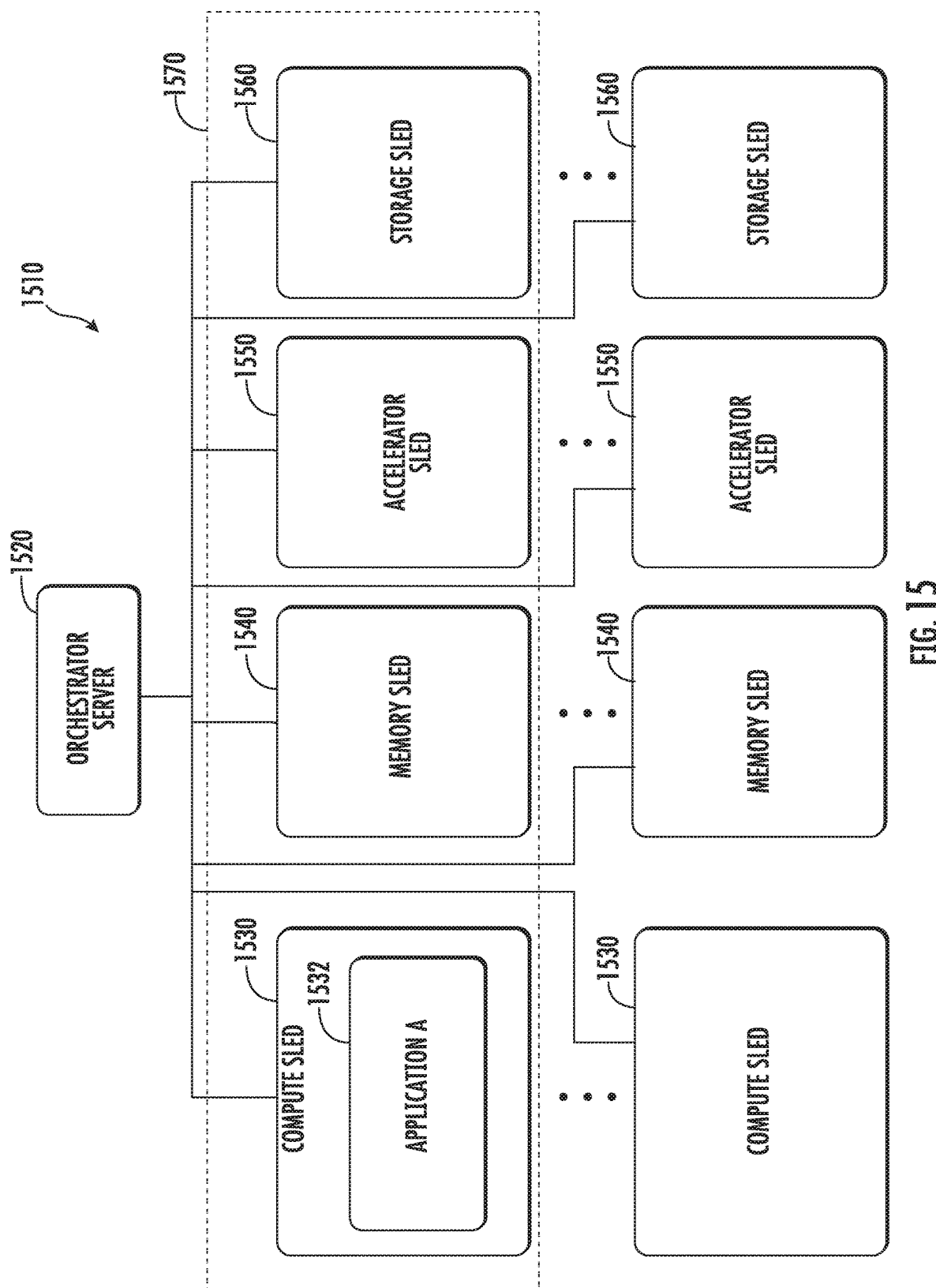
FIG. 15 is a simplified block diagram of a system that may be established within the data center of FIG. 1 to execute workloads with managed nodes composed of disaggregated resources.

Referring now to FIG. 15, a system for executing one or more workloads (e.g., applications) may be implemented in accordance with the data center 100. In the illustrative embodiment, the system 1510 includes an orchestrator server 1520, which may be embodied as a managed node comprising a compute device (e.g., a processor 820 on a compute sled 800) executing management software (e.g., a cloud operating environment, such as OpenStack) that is communicatively coupled to multiple sleds 400 including a large number of compute sleds 1530 (e.g., each similar to the compute sled 800), memory sleds 1540 (e.g., each similar to the memory sled 1400), accelerator sleds 1550 (e.g., each similar to the memory sled 1000), and storage sleds 1560 (e.g., each similar to the storage sled 1200). One or more of the sleds 1530, 1540, 1550, 1560 may be grouped into a managed node 1570, such as by the orchestrator server 1520, to collectively perform a workload (e.g., an application 1532 executed in a virtual machine or in a container). The managed node 1570 may be embodied as an assembly of physical resources 620, such as processors 820, memory resources 720, accelerator circuits 1020, or data storage 1250, from the same or different sleds 400. Further, the managed node may be established, defined, or "spun up" by the orchestrator server 1520 at the time a workload is to be assigned to the managed node or at any other time, and may exist regardless of whether any workloads are presently assigned to the managed node. In the illustrative embodiment, the orchestrator server 1520 may selectively allocate and/or deallocate physical resources 620 from the sleds 400 and/or add or remove one or more sleds 400 from the managed node 1570 as a function of quality of service (QoS) targets (e.g., performance targets associated with a throughput, latency, instructions per second, etc.) associated with a service level agreement for the workload (e.g., the application 1532). In doing so, the orchestrator server 1520 may receive telemetry data indicative of performance conditions (e.g., throughput, latency, instructions per second, etc.) in each sled 400 of the managed node 1570 and compare the telemetry data to the quality of service targets to determine whether the quality of service targets are being satisfied. The orchestrator server 1520 may additionally determine whether one or more physical resources may be deallocated from the managed node 1570 while still satisfying the QoS targets, thereby freeing up those physical resources for use in another managed node (e.g., to execute a different workload). Alternatively, if the QoS targets are not presently satisfied, the orchestrator server 1520 may determine to dynamically allocate additional physical resources to assist in the execution of the workload (e.g., the application 1532) while the workload is executing. Similarly, the orchestrator server 1520 may determine to dynamically deallocate physical resources from a managed node if the orchestrator server 1520 determines that deallocating the physical resource would result in QoS targets still being met.

Additionally, in some embodiments, the orchestrator server 1520 may identify trends in the resource utilization of the workload (e.g., the application 1532), such as by identifying phases of execution (e.g., time periods in which different operations, each having different resource utilizations characteristics, are performed) of the workload (e.g., the application 1532) and pre-emptively identifying available resources in the data center 100 and allocating them to the managed node 1570 (e.g., within a predefined time period of the associated phase beginning). In some embodiments, the orchestrator server 1520 may model performance based on various latencies and a distribution scheme to place workloads among compute sleds and other resources (e.g., accelerator sleds, memory sleds, storage sleds) in the data center 100. For example, the orchestrator server 1520 may utilize a model that accounts for the performance of resources on the sleds 400 (e.g., FPGA performance, memory access latency, etc.) and the performance (e.g., congestion, latency, bandwidth) of the path through the network to the resource (e.g., FPGA). As such, the orchestrator server 1520 may determine which resource(s) should be used with which workloads based on the total latency associated with each potential resource available in the data center 100 (e.g., the latency associated with the performance of the resource itself in addition to the latency associated with the path through the network between the compute sled executing the workload and the sled 400 on which the resource is located).

In some embodiments, the orchestrator server 1520 may generate a map of heat generation in the data center 100 using telemetry data (e.g., temperatures, fan speeds, etc.) reported from the sleds 400 and allocate resources to managed nodes as a function of the map of heat generation and predicted heat generation associated with different workloads, to maintain a target temperature and heat distribution in the data center 100. Additionally or alternatively, in some embodiments, the orchestrator server 1520 may organize received telemetry data into a hierarchical model that is indicative of a relationship between the managed nodes (e.g., a spatial relationship such as the physical locations of the resources of the managed nodes within the data center 100 and/or a functional relationship, such as groupings of the managed nodes by the customers the managed nodes provide services for, the types of functions typically performed by the managed nodes, managed nodes that typically share or exchange workloads among each other, etc.). Based on differences in the physical locations and resources in the managed nodes, a given workload may exhibit different resource utilizations (e.g., cause a different internal temperature, use a different percentage of processor or memory capacity) across the resources of different managed nodes. The orchestrator server 1520 may determine the differences based on the telemetry data stored in the hierarchical model and factor the differences into a prediction of future resource utilization of a workload if the workload is reassigned from one managed node to another managed node, to accurately balance resource utilization in the data center 100.

To reduce the computational load on the orchestrator server 1520 and the data transfer load on the network, in some embodiments, the orchestrator server 1520 may send self-test information to the sleds 400 to enable each sled 400 to locally (e.g., on the sled 400) determine whether telemetry data generated by the sled 400 satisfies one or more conditions (e.g., an available capacity that satisfies a predefined threshold, a temperature that satisfies a predefined threshold, etc.). Each sled 400 may then report back a simplified result (e.g., yes or no) to the orchestrator server 1520, which the orchestrator server 1520 may utilize in determining the allocation of resources to managed nodes.

Figure 16:
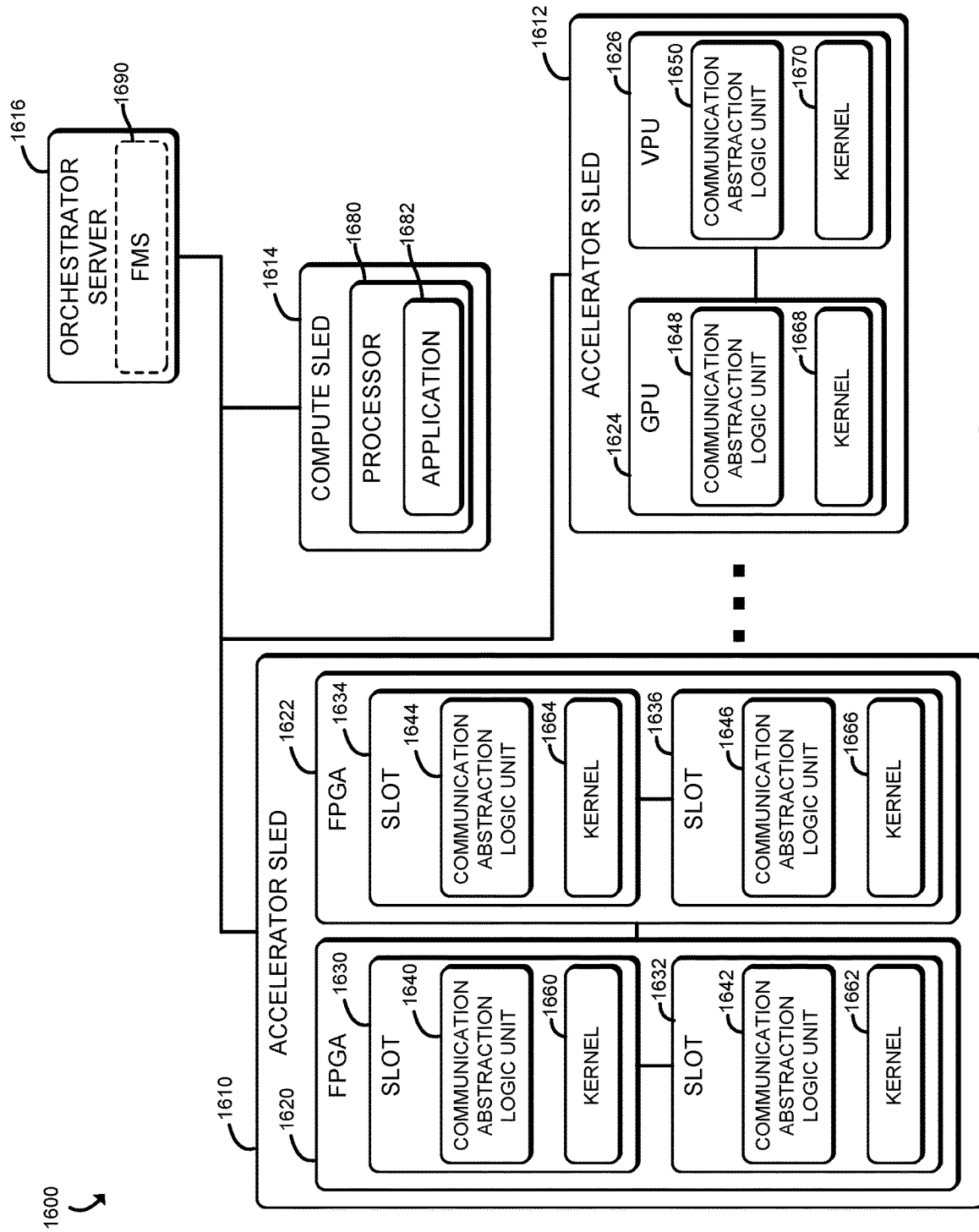
FIG. 16 is a simplified diagram of at least one embodiment of a system for providing dynamic communication path modification for accelerator device kernels.

Referring now to FIG. 16, a system 1600 for providing dynamic communication path modification for accelerator device kernels includes multiple accelerator sleds 1610, 1612, and a compute sled 1614 in communication with each other and with an orchestrator server 1616, which may also be referred to as a telemetry service device. The orchestrator server 1616 may execute a function management service (FMS) 1690, which may be embodied as one or more operations for tracking the availability of functions in the system 1600 that may be performed on behalf of a requesting device (e.g., on behalf of a customer, in a functions-as-a-service (FaaS) model). In other embodiments, the FMS 1690 may be executed on a separate compute device in communication with the orchestrator server 1616. Each accelerator sled 1610, 1612 is similar to the accelerator sled 1000 of FIG. 10. While two accelerator sleds 1610, 1612 are shown for clarity, it should be understood that the system 1600 may have a different number of accelerator sleds (e.g., tens, hundreds, or thousands) and may include other types of sleds (memory, storage, etc.). In the illustrative embodiment, the accelerator sled 1610 includes two accelerator devices 1620, 1622, similar to the accelerator circuits 1020 of the accelerator sled 1000 of FIG. 10. In the illustrative embodiment, each accelerator device 1620, 1622 is an FPGA. The gates of the FPGA 1620 are partitioned into two slots 1630, 1632 (e.g., each a subset of the gates present in the FPGA 1620). Each slot 1630, 1632 implements a corresponding kernel 1660, 1662, each of which may be embodied as a set of gates configured to perform a set of functions (e.g., operations offloaded from a compute sled, such as the compute sled 1614, to increase the speed at which a workload (e.g., the application 1682 executed by a processor 1680) is performed on behalf of a customer, also referred to herein as a tenant). Additionally, each slot 1630, 1632, in the illustrative embodiment, includes a communication abstraction logic unit 1640, 1642 which may be embodied as any device or circuitry (e.g., a subset of the gates of the corresponding slot 1630, 1632, a processor, a controller, etc.) configured to identify other accelerator devices and accelerator device kernels available in the system 1600, identify physical communication path(s) between the corresponding kernel 1660, 1662 and the identified accelerator devices and kernels in the system 1600, determine a logical communication path with one or more of the accelerator devices and their associated kernel(s) (e.g., during a boot up sequence of the corresponding accelerator device 1620, 1622), and continually evaluate conditions in the system (e.g., changes in the amount of communication traffic on the physical communication paths, patterns in the resource utilizations of workloads being executed by the kernels in the system 1600 that may affect the amount of traffic on the physical communication paths, etc.) to potentially reroute or otherwise change the allocation of the underlying physical communication paths to a given logical communication path (e.g., to maintain a target quality of service, such as a target latency, a target bandwidth, etc.). In doing so, the communication abstraction logic unit 1640, 1642 may preemptively allocate physical communication path capacity (e.g., bandwidth) in preparation for a predicted increase in congestion (e.g., communication traffic) in one or more physical communication paths that are presently allocated to a logical communication path. The physical communication paths are embodied as the underlying buses and networking connections (e.g., PCIe, Ethernet, optical fiber, waveguides, etc.) within an accelerator device, between accelerator devices on the same sled, or between sleds and a logical communication connection is an abstraction of the one or more of the physical communication paths, exposed by the communication abstraction logic unit 1640, 1642 to the corresponding kernel 1660, 1662. By offloading, from the corresponding kernel, the operations associated with establishing and maintaining (e.g., rerouting or otherwise modifying) a communication path with one or more other kernels, the communication abstraction logic unit 1640, 1644 frees up the corresponding kernel (e.g., and the developer of the kernel) to focus on performing accelerated operations on behalf of a tenant (e.g., to increase the speed at which a workload is performed).

The accelerator device 1622 includes slots 1634, 1636, similar to the slots 1630, 1632 described above. Further, each slot 1634, 1636 includes a corresponding kernel 1664, 1666 and communication abstraction logic unit 1644, 1646, similar to the communication abstraction logic units 1640, 1642 described above. Additionally, the accelerator sled 1612 includes accelerators devices 1624 and 1626. The accelerator device 1624, in the illustrative embodiment, is a graphics processing unit (GPU), which may be embodied as any device or circuitry (e.g., a programmable logic chip, a processor, etc.) configured to perform graphics-related computations (e.g., matrix multiplication, vector operations, etc.), and the accelerator device 1626, in the illustrative embodiment, is a vision processing unit (VPU), which may be embodied as any device or circuitry (e.g., a programmable logic chip, a processor, etc.) configured to perform operations related to machine vision, machine learning, and artificial intelligence. Each accelerator device 1624, 1626, in the illustrative embodiment, includes a corresponding kernel 1668, 1670 and communication abstraction logic unit 1648, 1650, similar to the communication abstraction logic units 1640, 1642 described above. While, in the illustrative embodiment, each slot of the accelerator devices 1620, 1622 (FPGAs) includes a corresponding communication abstraction logic unit, in other embodiments, there may be one communication abstraction logic unit per accelerator device, or one abstraction logic unit per sled.

Figure 17:
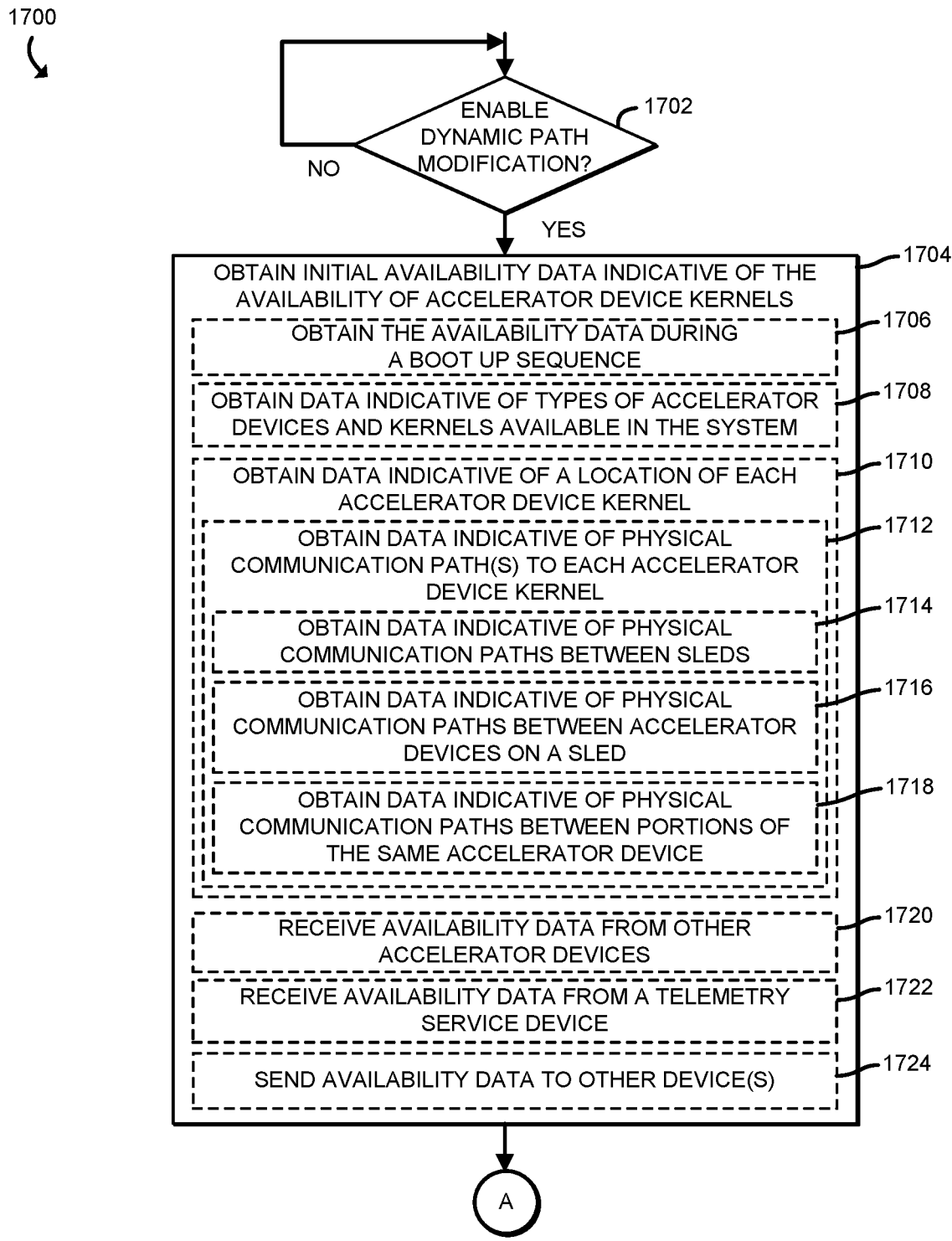
FIGS. 17-20 are a simplified block diagram of at least one embodiment of a method for providing dynamic communication path modification that may be performed by an accelerator device included in the system of FIG. 16.

Referring now to FIG. 17, the accelerator device 1620, in operation, may perform a method for providing dynamic communication path modification (e.g., dynamic modification of a logical communication path) for an accelerator device kernel (e.g., the kernel 1660). While the method 1700 is described as being performed by the accelerator device 1620, it should be understood that any other accelerator device 1622, 1624, 1626 may also perform the method 1700.

The method 1700 begins with block 1702, in which the accelerator device 1620 (e.g., the communication abstraction logic unit 1640) determines whether to enable dynamic communication path modification. In the illustrative embodiment, the accelerator device 1620 (e.g., the communication abstraction logic unit 1640) may determine to enable dynamic communication path modification in response to determining that the accelerator device 1620 is equipped with a communication abstraction logic unit (e.g., the communication abstraction logic unit 1640). In other embodiments, the accelerator device 1620 (e.g., the communication abstraction logic unit 1640) may determine to enable dynamic communication path modification based on other factors. Regardless, in response to a determination to enable dynamic communication path modification, the method 1700 advances to block 1704 in which the accelerator device 1620 (e.g., the communication abstraction logic unit 1640) obtains availability data indicative of the availability of accelerator device kernels (e.g., of the accelerator devices and the kernels implemented on the accelerator devices) in the system 1600. In the illustrative embodiment, the accelerator device 1620 (e.g., the communication abstraction logic unit 1640) obtains the availability data during a boot up sequence (e.g., an initialization phase, before the kernel 1660 executes workload-related operations), as indicated in block 1706. As indicated in block 1708, in the illustrative embodiment, the accelerator device 1620 (e.g., the communication abstraction logic unit 1640) obtains data indicative of types of accelerator devices and kernels available in the system 1600. For example, the accelerator device 1620 (e.g., the communication abstraction logic unit 1640) may receive data indicating that the accelerator sled 1610 includes two accelerator devices 1620, 1622, which are both FPGAs, and that each FPGA 1620, 1622 has two slots 1630, 1632, 1634, 1636 with a corresponding kernel. Further, the availability data, in the illustrative embodiment, indicates the set of functions that the kernel in each slot of each FPGA is capable of performing. Further, the availability data, in the illustrative embodiment, indicates that the accelerator sled 1612 includes the GPU 1624 and that the corresponding kernel 1668 supports a corresponding set of functions (e.g., matrix multiplication operations), and that the accelerator sled 1612 includes the VPU 1626 and that the corresponding kernel 1670 supports a corresponding set of functions (e.g., object recognition operations, neural network training operations, etc.).

In the illustrative embodiment, the accelerator device 1620 (e.g., the communication abstraction logic unit 1640) obtains initial availability data indicative of a location of each accelerator device kernel (e.g., the kernels 1662, 1664, 1666, 1668, 1670) in the system 1600, as indicated in block 1710. In doing so, the accelerator device 1620 (e.g., the communication abstraction logic unit 1640) may obtain data indicative of physical communication paths to each accelerator device kernel, as indicated in block 1712. For example, and as indicated in block 1714, the accelerator device 1620 (e.g., the communication abstraction logic unit 1640) obtains data indicative of physical communication paths between sleds 1610, 1612 (e.g., an Ethernet connection, an optical fiber connection, a waveguide connection, etc., including any switches or other intermediary devices). The accelerator device 1620 (e.g., the communication abstraction logic unit 1640) may obtain data indicative of physical communication paths between accelerator devices (e.g., between the accelerator device 1620, 1622) on the same sled (e.g., on the sled 1610), such as a peripheral component interconnect express (PCIe) bus, a serial interconnect, or other local bus, as indicated in block 1716. As indicated in block 1718, the accelerator device 1620 (e.g., the communication abstraction logic unit 1640) may obtain data indicative of physical communication paths between portions of the same accelerator device (e.g., between slots 1630, 1632 of the same FPGA 1620). As indicated in block 1720, the accelerator device 1620 (e.g., the communication abstraction logic unit 1640) may receive the availability data from other accelerator devices (e.g., from the communication abstraction logic units 1642, 1644, 1646, 1648, 1650). Additionally or alternatively, the accelerator device 1620 (e.g., the communication abstraction logic unit 1640) may receive the availability data from a telemetry service device (e.g., the orchestrator server 1616), as indicated in block 1722. The accelerator device 1620 (e.g., the communication abstraction logic unit 1640) may additionally send availability data (e.g., availability data indicating the location of the kernel 1660 and or availability data received by the accelerator device 1620) to other devices (e.g., to the orchestrator server 1606 or to other accelerator devices 1622, 1624, 1626, such as in a mesh networking scheme), as indicated in block 1724. Subsequently, the method 1700 advances to block 1726 of FIG. 18, in which the accelerator device 1620 (e.g., the communication abstraction logic unit 1640) produces, as a function of the initial availability data, a connectivity matrix, which may be embodied as any data indicative of physical communication paths between accelerator device kernels (e.g., the kernels 1660, 1662, 1664, 1666, 1668, 1670) and one or more logical communication paths defined by one or more of the physical communication paths.

Figure 18:
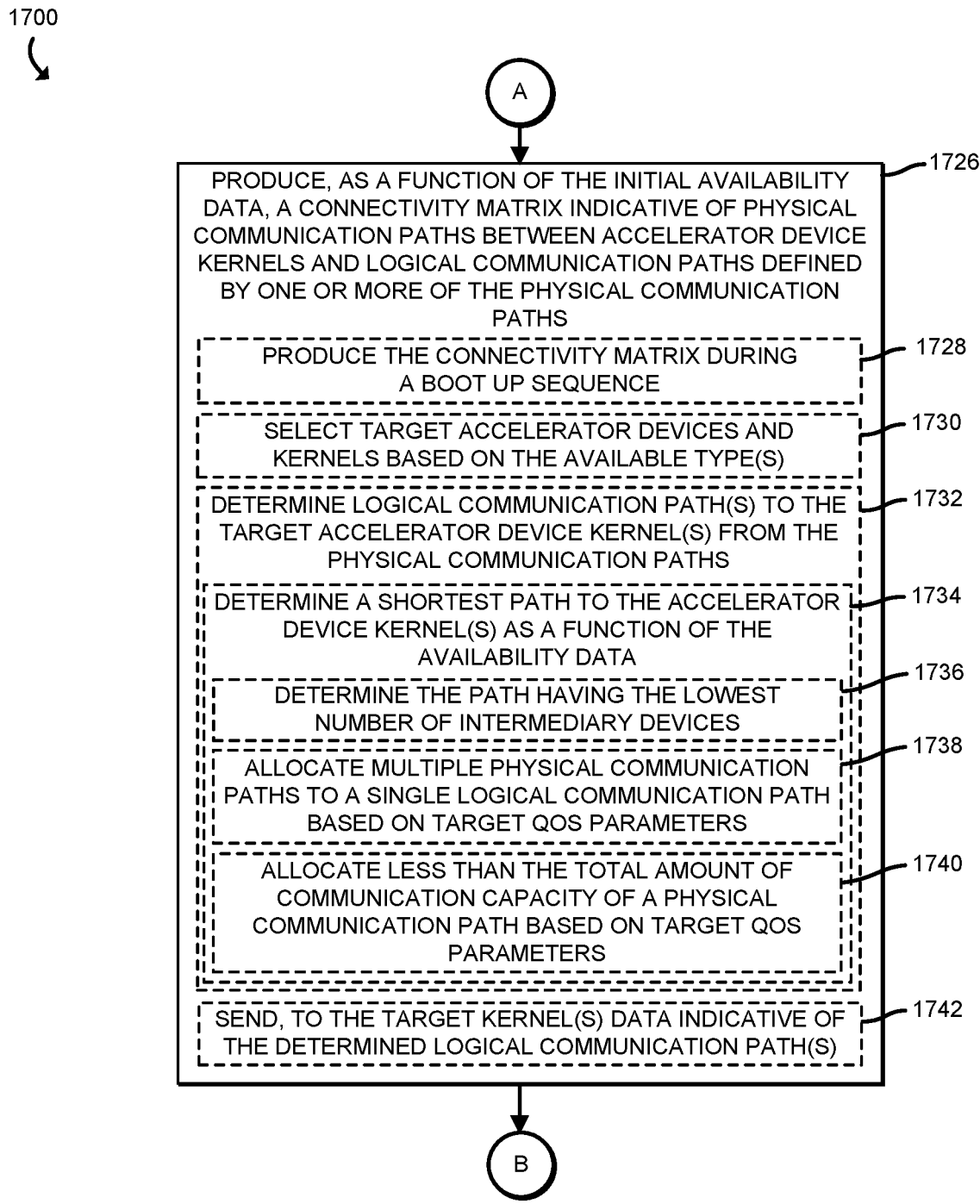

Referring now to FIG. 18, in the illustrative embodiment, the accelerator device 1620 (e.g., the communication abstraction logic unit 1640) produces the connectivity matrix during a boot up sequence (e.g., an initialization phase, before the kernel 1660 executes workload-related operations), as indicated in block 1728. As indicated in block 1730, the accelerator device 1620 (e.g., the communication abstraction logic unit 1640) selects target accelerator device(s) (e.g., accelerator devices to communicate with) and corresponding kernels, based on the available types (e.g., the accelerator device type and kernel type from blocks 1744, 1746) of accelerator devices and kernels (e.g., from block 1708) in the system 1600. For example, the accelerator device 1620 (e.g., the communication abstraction logic unit 1640) may select one or more kernels and corresponding accelerator devices that are configured to perform a set of functions that complement the functions provided by the kernel 1660 (e.g., to split a workload between the kernels, to perform different stages of a pipeline of operations on a data set, etc.). In block 1732, the accelerator device 1620 (e.g., the communication abstraction logic unit 1640), determines logical communication path(s) to the target accelerator device kernel(s) based on the available physical communication paths. In doing so, and as indicated in block 1734, the accelerator device 1620 (e.g., the communication abstraction logic unit 1640) determines a shortest path to the accelerator device kernel(s) as a function of the availability data. In doing so, and as indicated in block 1736, the accelerator device 1620 (e.g., the communication abstraction logic unit 1640) may determine the path having the lowest number of intermediary devices (e.g., switches, other accelerator devices through which the target accelerator device is connected to the accelerator device 1620, etc.). In block 1738, the accelerator device 1620 (e.g., the communication abstraction logic unit 1640) may allocate multiple physical communication paths to a single logical communication path based on one or more target quality of service parameters (e.g., combining multiple physical communication paths to obtain a target bandwidth), which may be defined in a service level agreement (SLA) between a tenant (e.g., customer) associated with the workload and an operator of the system 1600. Conversely, and as indicated in block 1740, the accelerator device 1620 (e.g., the communication abstraction logic unit 1640) may allocate less than the total amount of communication capacity of a given physical communication path to the logical communication path, based on the target quality of service parameters (e.g., the target bandwidth is less than the total available bandwidth of a given physical communication path). In some embodiments, the accelerator device 1620 may define a logical communication path based on other factors. For example, the accelerator device 1620 may define a logical communication path with the objective of performing load balancing and/or to maintain equal distances (e.g., within a customer-defined range) between accelerator devices (e.g., to provide equal latencies among the accelerator devices). In the illustrative embodiment, the accelerator device 1620 (e.g., the communication abstraction logic unit 1640) sends data indicative of the established logical communication path (e.g., the selected physical communication path(s) and the capacities of the physical communication path(s) to be allocated to a given logical communication path) to the target kernels (e.g., to the communication abstraction logic unit 1642, 1646, 1648, 1650 associated with the target kernel), as indicated in block 1742. If the accelerator device 1620 (e.g., the communication abstraction logic unit 1640) determines that a logical communication path cannot be defined to satisfy a given parameter (e.g., a target QoS parameter), the accelerator device 1620 (e.g., the communication abstraction logic unit 1640) may call a software stack (e.g., an application or an orchestration stack) to report an error. Subsequently, the method 1700 advances to block 1744 of FIG. 19, in which the accelerator device 1620 (e.g., the communication abstraction logic unit 1640) communicates data between accelerator device kernels using the established logical communication path(s), as defined in the connectivity matrix.

Figure 19:
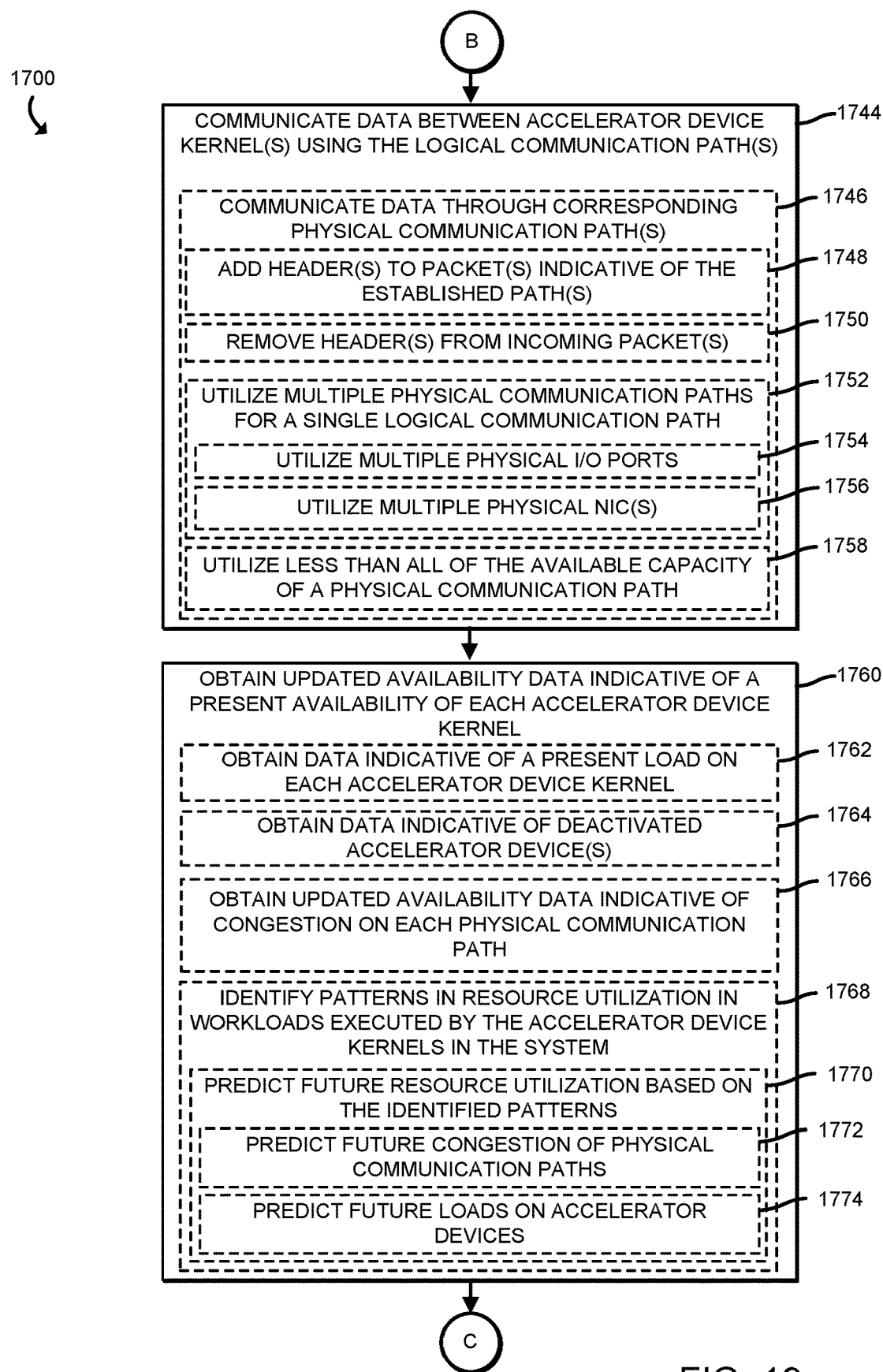

Referring now to FIG. 19, in communicating the data, the accelerator device 1620 (e.g., the communication abstraction logic unit 1640) communicates data through the corresponding physical communication path(s), as indicated in block 1746. In doing so, the accelerator device 1620 (e.g., the communication abstraction logic unit 1640) may add one or more headers to packets associated with the established logical communication path(s) (e.g., routing data to enable the packet(s) to travel through the corresponding physical communication path(s) to the target kernel(s)), as indicated in block 1748. Additionally, in the illustrative embodiment, the accelerator device 1620 (e.g., the communication abstraction logic unit 1640) may remove headers from incoming packets, as indicated in block 1750. As indicated in block 1752, the accelerator device 1620 (e.g., the communication abstraction logic unit 1640) may utilize multiple physical communication paths for a single logical communication path. For example, the accelerator device 1620 (e.g., the communication abstraction logic unit 1640) may utilize multiple physical I/O ports, as indicated in block 1754 and/or may utilize multiple physical network interface controllers (NICs), as indicated in block 1756. As indicated in block 1758, the accelerator device 1620 (e.g., the communication abstraction logic unit 1640) may utilize less than all of the available capacity of a physical communication path to communicate data with the target kernel(s).

Further, and as indicated in block 1760, the accelerator device 1620 (e.g., the communication abstraction logic unit 1640) obtains updated (e.g., subsequent) availability data (e.g., from other communication abstraction logic units 1642, 1644, 1646, 1648, 1650 and/or from the orchestrator server 1616) indicative of the present availability of each accelerator device kernel 1662, 1664, 1666, 1668, 1670. In doing so, the accelerator device 1620 (e.g., the communication abstraction logic unit 1640) may obtain data indicative of a present load on each accelerator device kernel (e.g., a percentage of total computational throughput being used, a number of operations per second presently being performed, etc.), as indicated in block 1762. As indicated in block 1764, the accelerator device 1620 (e.g., the communication abstraction logic unit 1640) may obtain data indicative of deactivated accelerator devices (e.g., accelerator devices with no capacity) in the system 1600, as indicated in block 1764. As indicated in block 1766, the accelerator device 1620 (e.g., the communication abstraction logic unit 1640) may obtain updated availability data indicative of congestion on each physical communication path (e.g., a latency, an amount of packets sent per second, an amount of data sent per second, a percentage of the total bandwidth of the physical communication path being used, etc.). Using the updated availability data, the accelerator device 1620 (e.g., the communication abstraction logic unit 1640) may identify patterns (e.g., fingerprints) in the utilization of resources (e.g., usage of the available data communication capacity of the physical communication paths) by the workloads executed by the accelerator device kernels in the system 1600, as indicated in block 1768. For example, an identified pattern may include several phases, each characterized by a percentage of the available communication capacity of one or more physical communication paths used during that phase and a length of time of that phase. Each phase may also be characterized by other metrics (e.g., number of operations per second performed by the corresponding kernel, etc.) which may correspond with the amount of data communicated by the corresponding kernel through the corresponding physical communication path(s) during that phase. Based on the identified patterns, the accelerator device 1620 (e.g., the communication abstraction logic unit 1640) may predict future resource utilizations in the system 1600, as indicated in block 1770. For example, the accelerator device 1620 (e.g., the communication abstraction logic unit 1640) may predict future amounts of congestion of one or more physical communication paths, as indicated in block 1772 and/or may predict future loads on one or more accelerator devices in the system 1600, as indicated in block 1774. As discussed above, the load on an accelerator device (e.g., on a kernel of the accelerator device) may impact the amount of available communication capacity (e.g., bandwidth) of the physical communication paths associated with (e.g., used by) that accelerator device. Subsequently, the method 1700 advances to block 1776 of FIG. 20 in which the accelerator device 1620 (e.g., the communication abstraction logic unit 1640) updates the connectivity matrix to modify one or more logical communication paths as a function of the updated availability data.

Figure 20:
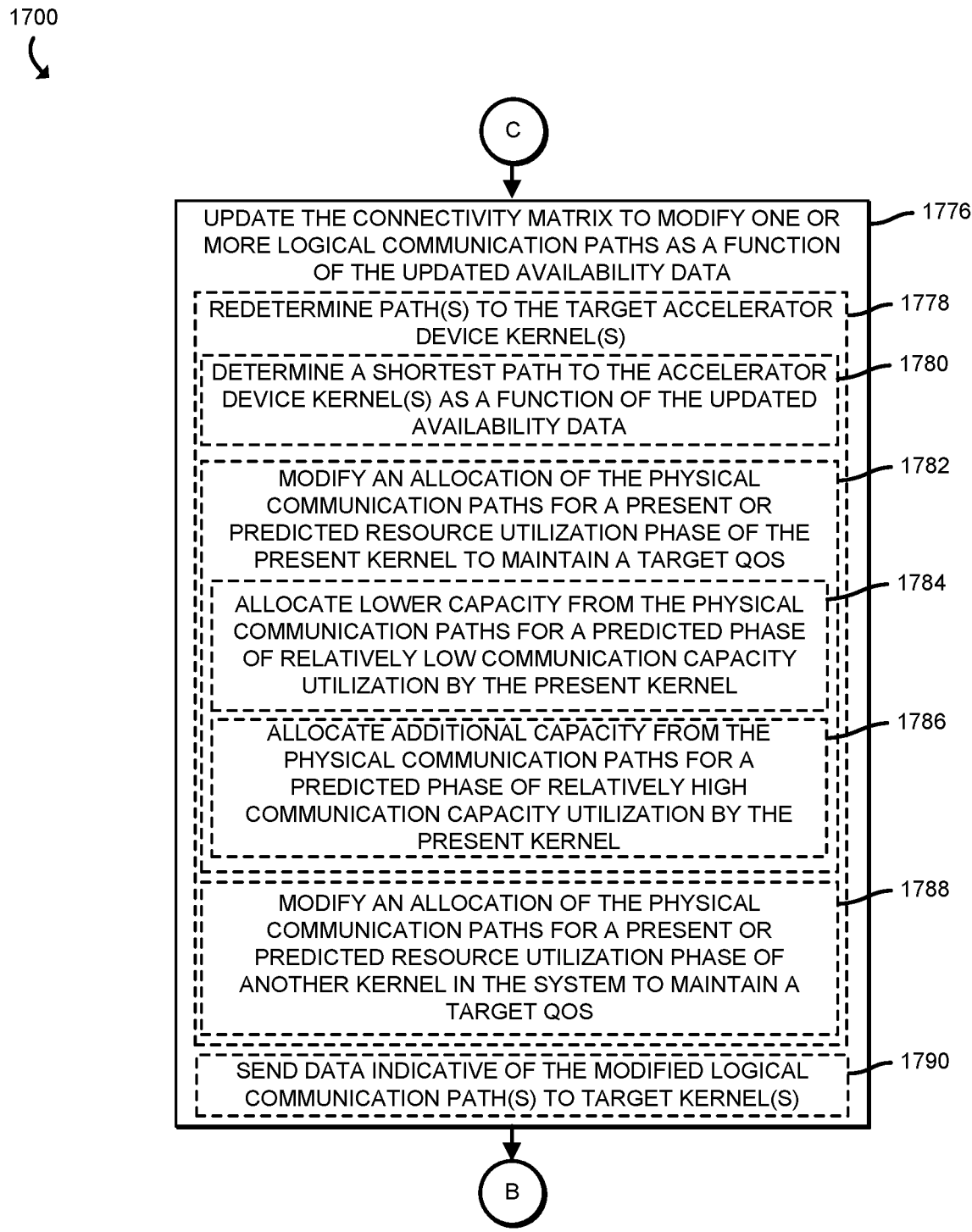

Referring now to FIG. 20, in updating the connectivity matrix, the accelerator device 1620 (e.g., the communication abstraction logic unit 1640) re-determines one or more paths (e.g., logical communication path(s)) to the target accelerator device kernel(s), as indicated in block 1778. For example, and as indicated in block 1780, the accelerator device (e.g., the communication abstraction logic 1640) again determines the shortest path (e.g., in terms of latency, which may be directly related to the amount of congestion on one or more physical communication paths) as a function of the updated availability data. As indicated in block 1782, the accelerator device 1620 (e.g., the communication abstraction logic unit 1640) may modify an allocation of the physical communication paths for a present or predicted resource utilization phase of the present kernel (e.g., the kernel 1660) to maintain a target quality of service (e.g., a target latency and/or bandwidth defined in an SLA). In doing so, the accelerator device 1620 (e.g., the communication abstraction logic unit 1640) may allocate a lower (e.g., less) capacity from the physical communication paths for a phase (e.g., a phase that is predicted to occur next, based on an identified pattern from block 1768) of relatively low communication capacity utilization by the present kernel (e.g., by the kernel 1660), as indicated in block 1784. Conversely, the accelerator device 1620 (e.g., the communication abstraction logic unit 1640) may allocate additional capacity from the physical communication paths for a phase (e.g., a phase predicted to occur next) of relatively high communication capacity utilization by the present kernel (e.g., the kernel 1660), as indicated in block 1786. As indicated in block 1788, the accelerator device 1620 (e.g., the communication abstraction logic unit 1640) may modify an allocation of the physical communication paths for a present or predicted resource utilization phase of another kernel (e.g., other than the kernel 1660) in the system 1600 to maintain the target quality of service (e.g., add an additional physical communication path to the logical communication path used by the kernel 1660, to compensate for a predicted increase in an amount of congestion on one of the existing physical communication paths associated with the logical communication path). As indicated in block 1790, the accelerator device 1620 (e.g., the communication abstraction logic unit 1640) sends data indicative of the modified logical communication path(s) to one or more target kernels (e.g., the kernels with which the kernel 1660 is communicating with to perform a workload). Subsequently, the method 1700 loops back to block 1744 of FIG. 19, in which the accelerator device 1620 (e.g., the communication abstraction logic unit 1640) continues to communicate data between accelerator device kernels (e.g., the kernel 1660 and other kernels in the system 1600) using the re-determined logical communication path(s).

EXAMPLES

Illustrative examples of the technologies disclosed herein are provided below. An embodiment of the technologies may include any one or more, and any combination of, the examples described below.

Example 1 includes an accelerator device comprising circuitry to obtain initial availability data indicative of an availability of one or more accelerator device kernels in a system, including one or more physical communication paths to each accelerator device kernel; produce, as a function of the initial availability data, a connectivity matrix indicative of the physical communication paths and a logical communication path defined by one or more of the physical communication paths between a kernel of the present accelerator device and a target accelerator device kernel; obtain updated availability data indicative of a subsequent availability of each accelerator device kernel; and update, as a function of the updated availability data, the connectivity matrix to modify the logical communication path.

Example 2 includes the subject matter of Example 1, and wherein to produce the connectivity matrix comprises to produce the connectivity matrix during a boot up sequence of the accelerator device.

Example 3 includes the subject matter of any of Examples 1 and 2, and wherein to obtain the initial availability data comprises to obtain data indicative of a location of each accelerator device kernel.

Example 4 includes the subject matter of any of Examples 1-3, and wherein to produce the connectivity matrix comprises to determine a shortest path to the target accelerator device kernel.

Example 5 includes the subject matter of any of Examples 1-4, and wherein to produce the connectivity matrix comprises to allocate multiple physical communication paths to the logical communication path to obtain a target quality of service, to balance a load, or to provide a distance between the present accelerator device kernel and the target accelerator device kernel within a predefined range.

Example 6 includes the subject matter of any of Examples 1-5, and wherein to obtain updated availability data comprises to obtain data indicative of congestion on one or more the physical communication paths.

Example 7 includes the subject matter of any of Examples 1-6, and wherein to obtain updated availability data comprises to obtain data indicative of one or more deactivated accelerator devices in the system.

Example 8 includes the subject matter of any of Examples 1-7, and wherein to obtain updated availability data comprises to obtain data indicative of a present load on each accelerator device kernel.

Example 9 includes the subject matter of any of Examples 1-8, and wherein the circuitry is further to identify patterns in resource utilization of workloads executed by the accelerator device kernels in the system.

Example 10 includes the subject matter of any of Examples 1-9, and wherein the circuitry is further to predict a future resource utilization based the identified patterns.

Example 11 includes the subject matter of any of Examples 1-10, and wherein the circuitry is further to predict a future congestion of a physical communication path based on the identified patterns.

Example 12 includes the subject matter of any of Examples 1-11, and wherein to update the connectivity matrix to modify the logical communication path comprises to modify an allocation of the physical communication paths for a predicted resource utilization of one or more of the accelerator device kernels in the system.

Example 13 includes the subject matter of any of Examples 1-12, and wherein to update the connectivity matrix to modify the logical communication path comprises to modify an allocation of the physical communication paths for a predicted resource utilization of the kernel of the present accelerator device to maintain a target quality of service.

Example 14 includes one or more machine-readable storage media comprising a plurality of instructions stored thereon that, in response to being executed, cause an accelerator device to obtain initial availability data indicative of an availability of one or more accelerator device kernels in a system, including one or more physical communication paths to each accelerator device kernel; produce, as a function of the initial availability data, a connectivity matrix indicative of the physical communication paths and a logical communication path defined by one or more of the physical communication paths between a kernel of the present accelerator device and a target accelerator device kernel; obtain updated availability data indicative of a subsequent availability of each accelerator device kernel; and update, as a function of the updated availability data, the connectivity matrix to modify the logical communication path.

Example 15 includes the subject matter of Example 14, and wherein to produce the connectivity matrix comprises to produce the connectivity matrix during a boot up sequence of the accelerator device.

Example 16 includes the subject matter of any of Examples 14 and 15, and wherein the instructions further cause the accelerator device to identify patterns in resource utilization of workloads executed by the accelerator device kernels in the system.

Example 17 includes the subject matter of any of Examples 14-16, and wherein the instructions further cause the accelerator device to predict a future resource utilization based the identified patterns.

Example 18 includes the subject matter of any of Examples 14-17, and wherein the instructions further cause the accelerator device to predict a future congestion of a physical communication path based on the identified patterns.

Example 19 includes the subject matter of any of Examples 14-18, and wherein to update the connectivity matrix to modify the logical communication path comprises to modify an allocation of the physical communication paths for a predicted resource utilization of one or more of the accelerator device kernels in the system.

Example 20 includes a method comprising obtaining, by an accelerator device, initial availability data indicative of an availability of one or more accelerator device kernels in a system, including one or more physical communication paths to each accelerator device kernel; producing, by the accelerator device and as a function of the initial availability data, a connectivity matrix indicative of the physical communication paths and a logical communication path defined by one or more of the physical communication paths between a kernel of the present accelerator device and a target accelerator device kernel; obtaining, by the accelerator device, updated availability data indicative of a subsequent availability of each accelerator device kernel; and updating, by the accelerator device and as a function of the updated availability data, the connectivity matrix to modify the logical communication path.

The invention claimed is:

1. An accelerator device comprising:
   circuitry to:
   obtain initial availability data indicative of an availability of one or more accelerator device kernels in a system, including one or more physical communication paths to each accelerator device kernel;
   produce, as a function of the initial availability data, a connectivity matrix indicative of the physical communication paths and a logical communication path defined by one or more of the physical communication paths between a kernel of the present accelerator device and a target accelerator device kernel and allocate multiple physical communication paths to the logical communication path to obtain a target quality of service, to balance a load, or to provide a distance between the present accelerator device kernel and the target accelerator device kernel within a predefined range;
   obtain updated availability data indicative of a subsequent availability of each accelerator device kernel; and
   update, as a function of the updated availability data, the connectivity matrix to modify the logical communication path.

2. The accelerator device of claim 1, wherein to produce the connectivity matrix comprises to produce the connectivity matrix during a boot up sequence of the accelerator device.

3. The accelerator device of claim 1, wherein to obtain the initial availability data comprises to obtain data indicative of a location of each accelerator device kernel.

4. The accelerator device of claim 1, wherein to produce the connectivity matrix comprises to determine a shortest path to the target accelerator device kernel.

5. The accelerator device of claim 1, wherein to obtain updated availability data comprises to obtain data indicative of congestion on one or more the physical communication paths.

6. The accelerator device of claim 1, wherein to obtain updated availability data comprises to obtain data indicative of one or more deactivated accelerator devices in the system.

7. The accelerator device of claim 1, wherein to obtain updated availability data comprises to obtain data indicative of a present load on each accelerator device kernel.

8. The accelerator device of claim 1, wherein the circuitry is further to identify patterns in resource utilization of workloads executed by the accelerator device kernels in the system.

9. The accelerator device of claim 8, wherein the circuitry is further to predict a future resource utilization based the identified patterns.

10. The accelerator device of claim 9, wherein the circuitry is further to predict a future congestion of a physical communication path based on the identified patterns.

11. The accelerator device of claim 1, wherein to update the connectivity matrix to modify the logical communication path comprises to modify an allocation of the physical communication paths for a predicted resource utilization of one or more of the accelerator device kernels in the system.

12. The accelerator device of claim 1, wherein to update the connectivity matrix to modify the logical communication path comprises to modify an allocation of the physical communication paths for a predicted resource utilization of the kernel of the present accelerator device to maintain a target quality of service.

13. One or more non-transitory machine-readable storage media comprising a plurality of instructions stored thereon that, in response to being executed, cause an accelerator device to:
   obtain initial availability data indicative of an availability of one or more accelerator device kernels in a system, including one or more physical communication paths to each accelerator device kernel;
   produce, as a function of the initial availability data, a connectivity matrix indicative of the physical communication paths and a logical communication path defined by one or more of the physical communication paths between a kernel of the present accelerator device and a target accelerator device kernel and allocate multiple physical communication paths to the logical communication path to obtain a target quality of service, to balance a load, or to provide a distance between the present accelerator device kernel and the target accelerator device kernel within a predefined range;
   obtain updated availability data indicative of a subsequent availability of each accelerator device kernel; and
   update, as a function of the updated availability data, the connectivity matrix to modify the logical communication path.

14. The one or more non-transitory machine-readable storage media of claim 13, wherein to produce the connectivity matrix comprises to produce the connectivity matrix during a boot up sequence of the accelerator device.

15. The one or more non-transitory machine-readable storage media of claim 13, wherein the instructions further cause the accelerator device to identify patterns in resource utilization of workloads executed by the accelerator device kernels in the system.

16. The one or more non-transitory machine-readable storage media of claim 15, wherein the instructions further cause the accelerator device to predict a future resource utilization based the identified patterns.

17. The one or more non-transitory machine-readable storage media of claim 16, wherein the instructions further cause the accelerator device to predict a future congestion of a physical communication path based on the identified patterns.

18. The one or more non-transitory machine-readable storage media of claim 13, wherein to update the connectivity matrix to modify the logical communication path comprises to modify an allocation of the physical communication paths for a predicted resource utilization of one or more of the accelerator device kernels in the system.

19. A method comprising:
obtaining, by an accelerator device, initial availability data indicative of an availability of one or more accelerator device kernels in a system, including one or more physical communication paths to each accelerator device kernel;
producing, by the accelerator device and as a function of the initial availability data, a connectivity matrix indicative of the physical communication paths and a logical communication path defined by one or more of the physical communication paths between a kernel of the present accelerator device and a target accelerator device kernel and allocating multiple physical communication paths to the logical communication path to obtain a target quality of service, to balance a load, or to provide a distance between the present accelerator device kernel and the target accelerator device kernel within a predefined range;
obtaining, by the accelerator device, updated availability data indicative of a subsequent availability of each accelerator device kernel; and
updating, by the accelerator device and as a function of the updated availability data, the connectivity matrix to modify the logical communication path.

\* \* \* \* \*